US006504935B1

(12) United States Patent
Jackson

(10) Patent No.: US 6,504,935 B1
(45) Date of Patent: Jan. 7, 2003

(54) METHOD AND APPARATUS FOR THE MODELING AND SYNTHESIS OF HARMONIC DISTORTION

(76) Inventor: Douglas L. Jackson, 8832 Luss Dr., Huntington Beach, CA (US) 92646

( * ) Notice: Subject to any disclaimer, the term of this patent is extended or adjusted under 35 U.S.C. 154(b) by 0 days.

(21) Appl. No.: 09/136,446

(22) Filed: Aug. 19, 1998

(51) Int. Cl.[7] .......................... H03G 3/00; H04B 15/00; H04R 27/00
(52) U.S. Cl. ......................... 381/61; 381/94.1; 381/84
(58) Field of Search ........................... 381/61, 94.1, 84

(56) References Cited

U.S. PATENT DOCUMENTS

| | | | |
|---|---|---|---|
| 4,868,869 A | | 9/1989 | Kramer |
| 4,888,808 A | * | 12/1989 | Ishikawa et al. ............ 351/103 |
| 4,949,177 A | | 8/1990 | Bannister et al. |
| 4,991,218 A | | 2/1991 | Kramer |
| 4,995,084 A | | 2/1991 | Pritchard |
| 5,235,410 A | | 8/1993 | Hurley |
| 5,253,043 A | | 10/1993 | Gibson |
| 5,349,546 A | | 9/1994 | Sharman |
| 5,506,910 A | * | 4/1996 | Miller et al. ................ 381/103 |
| 5,570,424 A | | 10/1996 | Araya et al. |

OTHER PUBLICATIONS

Daniel Arfib, Journal of the Audio Engineering Society, Oct. 1979, vol. 27, No. 10.*
Marc Le Brun,Journal of the Audio Engineering Society, Apr. 1979, vol. 27, No. 4.*
Charles R. Sullivan; Computer Music Journal; Extending the Karpus–Strong Algorithm to Synthesize Electric Guitar Timbres with Distortion and Feedback; Sep. 1, 1990; 12 pages.; see pp. 31–32.
Kai Lassfolk; Sound Processing Kit—User's Guide; SPKit-WaveShaper—User's Guide; 1995; 5 pages.
Marc Le Brun; Journal of the Audio Engineering Society; Digital Waveshaping Synthesis; Apr. 1, 1979; 16 pages.
Daniel Arfib; Journal of the Audio Engineering Society; Digital Synthesis of Complex Spectra by Means of Multiplication of Nonlinear Distorted Sine Waves; Oct. 1, 1979; 12 pages.
Hal Chamberlin; Musical Applications of Microprocessors—Second Edition; pp. 48–54, 473–480; 1985; 15 pages.
Ronald E. Crochiere; Lawrence R. Rabiner; Multirate Digital Signal Processing; 1983; reference text.

* cited by examiner

Primary Examiner—Forester W. Isen
Assistant Examiner—Elizabeth McChesney

(57) ABSTRACT

Distortion modeling produces distortion models for use by a distortion synthesizer to synthesize the harmonic distortion effects of audio distortion devices. A sinusoidal waveform is distorted by an audio distortion device and analyzed using a Fourier transform to produce a distortion model comprising harmonic amplitude and phase parameters. A phase correction process compensates for phase shifts induced by the audio distortion device. The distortion synthesizer uses a distortion function that distorts a digital audio signal according to the distortion model. The distortion model can be modified to alter the distortion effect and can be stored in a data-storage device for later retrieval. A frequency band-splitter and signal mixer allow the distortion effect to be applied only to the low frequency content of the digital audio signal, thus providing spectral headroom to suppress the production of aliasing noise. Aliasing-noise suppression is provided for a full-bandwidth signal by up-converting the sampling rate of the signal before applying the distortion function and down-converting the sampling rate afterwards. A process is provided to remove the direct-current component that may be induced into the signal by the distortion function.

20 Claims, 14 Drawing Sheets

METHOD AND APPARATUS FOR THE MODELING AND SYNTHESIS OF HARMONIC DISTORTION

TECHNICAL FIELD

This invention relates to digital audio signal processing, specifically to an improved method for imparting a harmonic distortion effect to a digital audio signal.

BACKGROUND—DESCRIPTION OF PRIOR ART

Most electronic systems that process (amplify, transmit, etc.) analog signals are designed to minimize the amount of harmonic distortion added to the signal. When processing audio signals, however, some types of harmonic distortion are desirable. Audio professionals, musicians, and audiophiles widely pursue the sonic characteristics of vacuum tubes, analog recording tape, transducers, and a variety of solid-state distortion devices. Harmonic distortion due to non-linear transfer characteristics, either inherent or deliberately induced, is mainly responsible for imparting the desirable effect.

The progress of digital recording and signal processing technologies is at a point where most audio signal processing tasks can be performed satisfactorily in the digital domain. One notable exception is distortion effects. Digital distortion effects generally lack the accuracy needed to be convincing replacements for their analog counterparts and tend to possess a harsh quality that reveals their digital origins.

U.S. Pat. No. 4,995,084 to Pritchard (Feb. 19, 1991) relates to a variety of analog semiconductor circuits for emulating the general characteristics of a vacuum tube amplifier. It also discloses digital versions that approximate the operation of the analog circuits.

U.S. Pat. No. 5,570,424 to Araya et al. (Oct. 29, 1996) relates to fixed distortion algorithms based on higher degree expressions, mainly comprising a series of cubic expressions.

Extending the Karpus-Strong Algorithm to Synthesize Electric Guitar Timbres with Distortion and Feedback by Charles R. Sullivan in the Computer Music Journal (Fall 1990) relates to an algorithm for computer music synthesis that includes a simple distortion function for providing a soft clipping effect.

The distortion generation methods used by Pritchard, Araya et al., and Sullivan use single-purpose, fixed algorithms that offer no programmability or variation of the distortion effect other than setting the input signal level. They do not emulate the distortion characteristics of any actual analog distortion device but instead provide only some characteristics of a generalized class of distortion device. They also do not provide any method of suppressing the aliasing noise that can result when performing a non-linear operation in a digital system.

Cool Edit Software version 1.53 by Syntrillium Software Corporation (1992–1996) relates to a computer program that provides numerous utilities for modifying digital audio files. It includes a distortion utility for graphically building a distortion curve from straight line segments. The curve represents the graph of an arbitrary transfer function that is applied symmetrically to the positive and negative values of an audio file. The term transfer function refers to the static or direct-current (DC) transfer characteristics of a distortion device. Cool Edit's distortion is limited to generating only odd harmonics due to the symmetry of the transfer function. It does not provide any method of suppressing the aliasing noise that can result when performing a non-linear operation in a digital system. The segmentation of the distortion curve generates high harmonics that are usually undesirable and further add to the aliasing noise.

SPKitWaveShaper—User's Guide by Kai Lassfolk in Sound Processing Kit—User's Guide (1995) relates to a distortion routine included in a unified collection of computer software routines designed for modifying digital audio files. The distortion routine imports a user-supplied file containing look-up table values that it uses to non-linearly transform an audio file. The routine simply executes the distortion process and has no bearing on the nature and origin of the distortion's characteristics. It does not provide any method of suppressing the aliasing noise that can result when performing a non-linear operation in a digital system.

Digital Waveshaping Synthesis by Marc Le Brun and Digital Synthesis of Complex Spectra by Means of Multiplication of Nonlinear Distorted Sine Waves by Daniel Arfib, both in the Journal of the Audio Engineering Society (April 1979 and October 1979, respectively) relate to a digital music synthesis technique for generating a complex waveform by applying a non-linear waveshaping function to a sinusoidal waveform. The work of Le Brun and Arfib provides a good theoretical insight into the relationship of a waveshaping function and the harmonics it produces. However, the focus is on the direct synthesis of musical instrument sounds and, as such, offers no method for applying a distortion effect to digital audio signals.

Musical Applications of Microprocessors—Second Edition by Hal Chamberlin (1985) relates to music synthesis and sound modification, providing a comprehensive collection of techniques, both analog and digital. More specifically, pages 48–54 describe the application of non-linear waveshaping to instrumental signals using analog techniques. Pages 473–480 describe digital non-linear waveshaping and state the advantages of digital waveshaping over the analog techniques described in the earlier section. The digital waveshaping functions described are limited to the synthesis of musical instrument sounds when applied to a sinusoidal waveform. No method is offered for generating a waveshaping function that would emulate another distortion device when applied to a digital audio signal.

U.S. Pat. Nos. 4,868,869 and 4,991,218 to Kramer (Sep. 19, 1989 and Feb. 5, 1991) relate to the non-linear waveshaping of digital audio signals, specifically when applied with a look-up table and performed in real time. They describe various general methods for generating waveshaping functions that are suitable primarily for experimentation. None involve the analysis of another distortion device. As such, no method is offered for generating a waveshaping function that would emulate another distortion device. No method is provided for suppressing the aliasing noise that can result when performing a non-linear operation in a digital system.

U.S. Pat. No. 5,235,410 to Hurley (Aug. 10, 1993), U.S. Pat. No. 4,949,177 to Bannister et al. (Aug. 14, 1990), U.S. Pat. No. 5,253,043 to Gibson (Oct. 12, 1993), and U.S. Pat. No. 5,349,546 to Sharman (Sep. 20, 1994) all relate to digital video signal processing, specifically non-linear processing that includes methods for reducing alias frequencies in the output signal. Although they do apply a form of distortion to a digital signal, their non-linear processing is specifically for video and is irrelevant for audio.

Besides the limitations already stated, none of the prior art perform direct analyses of existing distortion devices for deriving methods or models that can be used to emulate the distortion devices.

SUMMARY OF THE INVENTION

Accordingly, several objects and advantages of my invention are to provide a distortion modeling and synthesis method whereby analog audio distortion devices are accurately emulated using digital techniques, to provide a distortion modeling and synthesis method capable of synthesizing a virtually unlimited variety of distortion effects, and to provide a distortion modeling and synthesis method capable of suppressing the aliasing noise that can result when performing a non-linear operation in a digital system.

It is an additional object of the invention to provide a distortion modeling and synthesis method that permits modification of the distortion in terms of the harmonics it produces.

It is an additional object of the invention to provide a distortion modeling and synthesis method that facilitates efficient storage of distortion models for later recall and usage.

To accomplish the above-mentioned objects, the harmonic distortion effect of an audio distortion device is modeled by determining the harmonic characteristics of the distortion imparted to a signal by the distortion device. A distortion synthesizer uses the resulting distortion model to synthesize the distortion characteristics of the distortion device. The synthesized harmonic distortion effect imparted to a signal is virtually identical to that of the distortion device used to create the model.

To create a distortion model, the distortion device is operated using a pure, undistorted sinusoidal signal as an input. Spectral analysis is performed on the output signal from the distortion device to determine the amplitude and phase of the signal's harmonic components. The harmonic amplitude and phase parameters form the distortion model. A process is provided for correcting the phase parameters of distortion models created from distortion devices that induce phase shifts into the distorted signal. The distortion synthesizer provides a mechanism that uses the distortion model in performing a non-linear transformation of a digital signal. More precisely, the distortion synthesizer uses a mathematical function that accepts the harmonic amplitude and phase parameters of the distortion model. Applying the function to a digital signal of interest imparts harmonic distortion to the signal according to the distortion model.

Several advantages are realized by the modeling and synthesis approach to digital distortion as implemented in my invention. Foremost is the high accuracy with which the non-linearity of a distortion device is reproduced. Another advantage is the versatility of the invention. Rather than being a method for synthesizing the effect of one specific type of distortion device, the present invention provides a general method capable of synthesizing the effects of different types of distortion devices. The modeling method can extract the static non-linear transfer characteristics of a device even if its non-linear element can only be accessed dynamically, such as with analog recording tape. A further advantage is that the distortion model's components directly relate to the way humans perceive sound; that is, by the sound's harmonic content. As such, the distortion model can be modified to alter its sonic characteristics predictably. A distortion model contains a relatively small amount of data, typically less than one hundred numeric values, allowing for efficient storage of multiple models in a data-storage device.

A problem that occurs when generating harmonic distortion digitally is the production of aliasing noise. The frequencies of some of the harmonics added to a signal by the non-linear distortion process may exceed one-half of the sampling rate. Consequently, those harmonics fold back into the audible signal as aliasing noise. The ability to modify the distortion model of my invention has the further advantage of making it possible to reduce aliasing noise by eliminating the upper harmonics from the model. The distortion synthesizer contains further enhancements specifically for controlling aliasing noise. A frequency bandsplitter separates the input signal into a low frequency signal and a high frequency signal. Distortion is applied only to the low frequency signal, which is subsequently recombined with the high frequency signal. The bandlimiting action of the bandsplitter creates spectral headroom that permits the addition of harmonics without causing aliasing noise. To apply distortion to the full bandwidth of the input signal without causing aliasing noise, sampling-rate conversion is used. The distortion synthesizer provides mechanisms for increasing and decreasing the sampling rates of digital signals. Before applying the distortion, the input signal is converted to a higher sampling rate to create spectral headroom for accommodating the added harmonics. After applying the distortion, the signal is converted back to the original sampling rate. The conversion process removes the added harmonics having frequencies that exceed one-half of the reduced sampling rate, thereby preventing aliasing noise. Combining the bandsplitter with sampling-rate conversion further extends the spectral headroom.

Still further objects and advantages will become apparent from a consideration of the ensuing description and accompanying drawings.

BRIEF DESCRIPTION OF THE DRAWINGS

FIG. 19b shows a graph of the harmonic amplitudes of a distortion model derived from the transfer function shown in FIG. 19a.

FIG. 21b shows a graph of the distortion function using a distortion model derived from the waveform shown in FIG. 21a.

FIG. 21c shows a graph of a sine wave distorted by the distortion synthesizer of the present invention, using a distortion model derived from the waveform shown in FIG. 21a.

PREFERRED EMBODIMENT—DESCRIPTION

Figure 1:
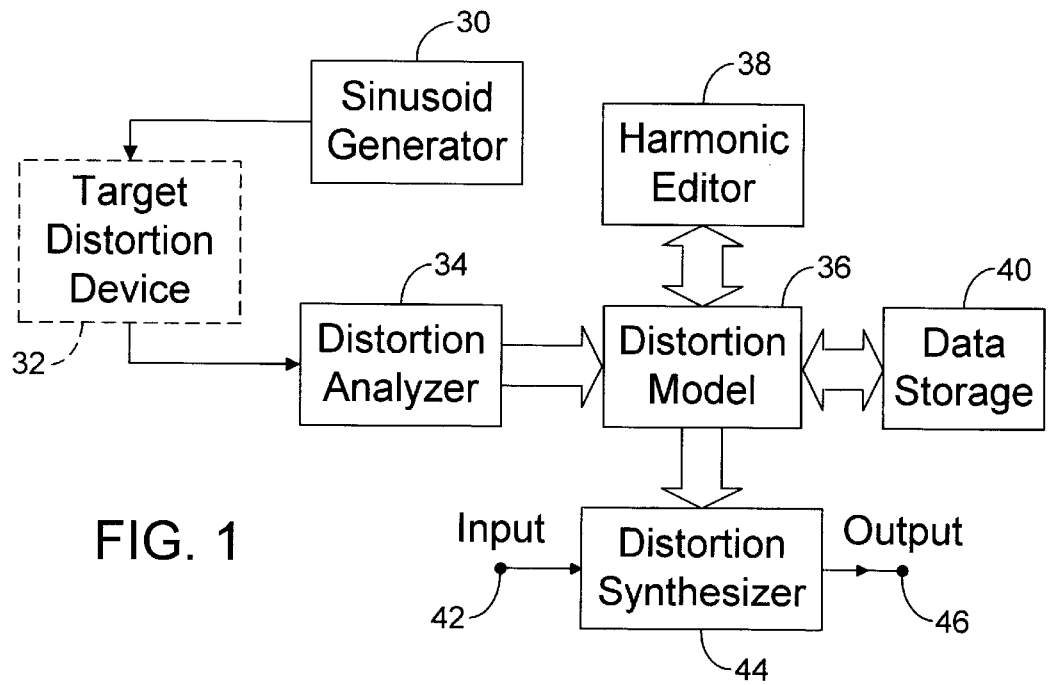
FIG. 1 is a block diagram of the preferred embodiment of the present invention.

FIG. 1—Basic Distortion Modeling and Synthesis

FIG. 1 is a block diagram of the preferred embodiment of the present invention. Beginning with the distortion modeling portion, a sinusoid generator 30 supplies an input signal to a target distortion device 32. The target distortion device is the device whose distortion characteristics are to be emulated or synthesized by the present invention. The output signal of target distortion device 32 is received by a spectrum analyzer, harmonic analyzer, or distortion analyzer 34 that produces a distortion model 36. Distortion model 36 can be modified by a harmonic editor mechanism or harmonic editor 38 and can be stored and retrieved by a data-storage mechanism or data-storage device 40.

Moving to the distortion synthesis portion, a digital input signal 42 is processed by a distortion synthesizer 44 according to distortion model 36, producing a digital output signal 46. Digital input signal 42 and digital output signal 46 are sequential digital values representing the instantaneous amplitude of audio signals. These digital values are also referred to as samples.

Figure 2:
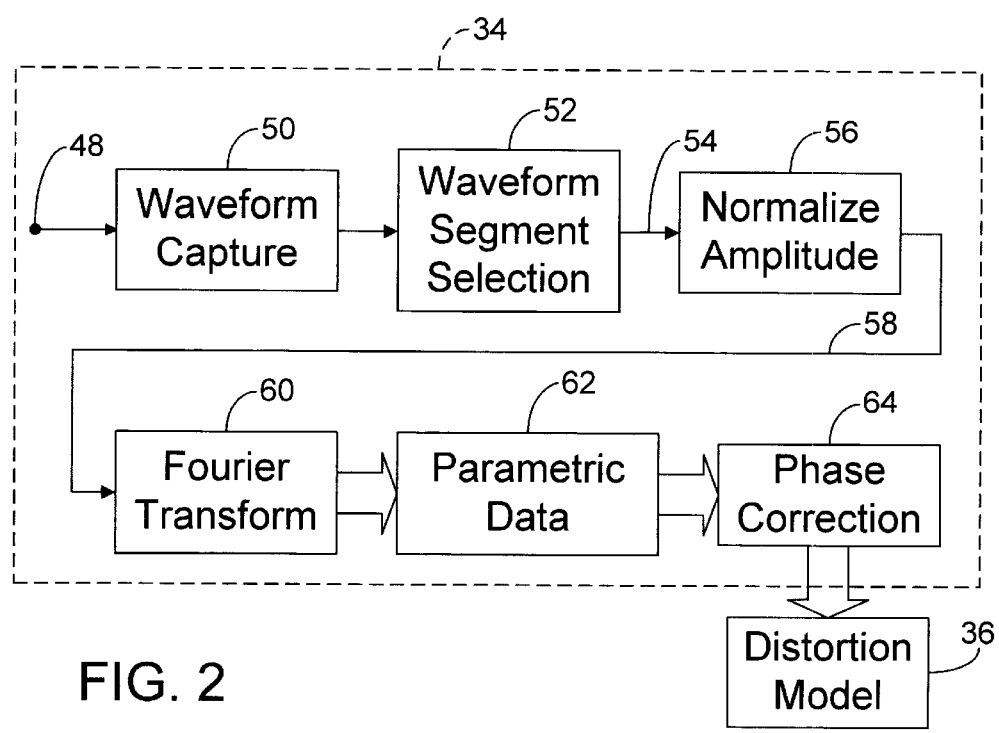
FIG. 2 is a block diagram of the distortion analyzer shown in FIG. 1.

FIG. 2—Distortion Analyzer

FIG. 2 is a block diagram of the distortion analyzer shown in FIG. 1. The output signal from target distortion device 32 of FIG. 1 is received by an analyzer input 48 and is captured by a waveform-capture operation 50. The captured waveform undergoes a waveform-segment-selection operation 52, producing a waveform segment 54 containing a single cycle of the analyzer input signal. Waveform segment 54 undergoes an amplitude-normalization operation 56, producing a normalized waveform segment 58. A Fourier transform 60 is performed on normalized waveform segment 58, generating parametric data 62. The parametric data undergo a phase-correction operation 64, producing distortion model 36, also shown in FIG. 1.

Figure 3:
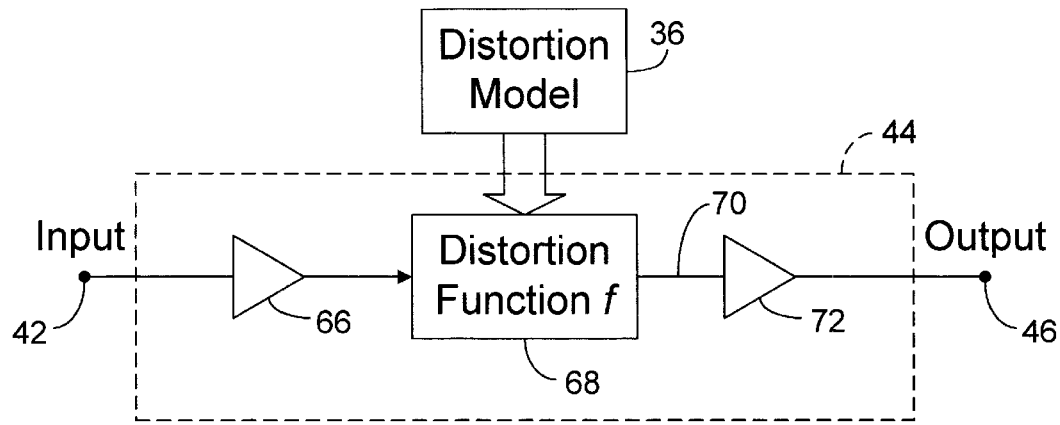
FIG. 3 is a block diagram of an embodiment of the distortion synthesizer shown in FIG. 1.

FIG. 3—Basic Distortion Synthesizer

FIG. 3 is a block diagram of an embodiment of the distortion synthesizer shown in FIG. 1. Digital input signal 42 is received by the input of an input amplifier 66. A non-linear transfer function, shaping function, or distortion function 68 is applied to the output of input amplifier 66, producing a distorted signal 70. The characteristics of distortion function 68 are determined by distortion model 36. Distorted signal 70 is routed to the input of an output amplifier 72 that produces digital output signal 46.

PREFERRED EMBODIMENT—OPERATION

Operation of the apparatus and underlying method of the present invention will be described further with reference to FIGS. 1, 2, 3, 16, and 17.

Most of the embodiments of the present invention exist in a prototype implemented on a general-purpose computer equipped with analog to digital (A/D) and digital to analog (D/A) converters. Where appropriate, descriptions of the prototype are used as example implementations.

Distortion Modeling

The distortion modeling process consists of several steps. The description of each step and/or the apparatus required to perform it follows. The modeling steps can be performed either manually or by an automated process.

Sinusoid Generator

Referring to FIG. 1, sinusoid generator 30 generates a sinusoidal signal of sufficient amplitude to operate target distortion device 32 at the desired distortion level. The sinusoid generator may be either an integral part of the modeling sub-system or a completely independent unit. The sinusoid generator's output must be compatible with the input of the target distortion device, which may be analog or digital. The preferred sinusoid generator is an integral part of the modeling sub-system, where the waveform is generated digitally and converted to an analog signal using a D/A converter that uses the same timing circuitry as the A/D converter used by the waveform-capture operation. This assumes that the target distortion device's input and output are analog. In some cases, the target distortion device may be completely digital and A/D and D/A conversion is not necessary. The waveform samples are calculated and stored in memory before being sent as a signal to the target distortion device. The frequency and amplitude of the waveform are programmable. Generally, using a frequency near the lower end of the target distortion device's operating range gives the best results. This maximizes the number of samples in each cycle of the waveform, maximizing the resolution and accuracy of the modeling process.

Target Distortion Device

The target distortion device can be any audio device that produces harmonic distortion due to non-linear transfer characteristics. Some examples are vacuum tubes, saturated analog recording tape, and solid-state distortion circuits. The device may be digital where the distortion is produced mathematically or arbitrarily using a computing device. Other computer-based techniques such as physical modeling algorithms and computer-aided engineering (CAE) circuit simulations can also serve as target distortion devices.

Specialized equipment may be necessary for modeling certain devices. For example, the signal buffering capabilities of an oscilloscope or similar device may be needed to provide isolation from the high voltages present in a vacuum tube circuit. The target distortion device is operated at the maximum distortion level that the resulting distortion synthesis is expected to achieve. Making multiple distortion models at distortion levels appropriate for different applications makes better use of the dynamic range of the synthesis system. Any filter in the signal path after the device's non-linear element must be bypassed to preserve the true amplitudes of the harmonics.

Distortion Analyzer

The distorted sinusoidal signal from the target distortion device is analyzed by distortion analyzer 34 to characterize the harmonics of the signal. Some laboratory instruments, such as spectrum analyzers or other specialized signal analyzers, may have the capabilities to perform part of the distortion analysis. To qualify, the instrument must be able to precisely measure the amplitude and phase of each harmonic of a signal. Although such an instrument can be used, the preferred method of implementing distortion analyzer 34 employs a Fourier transform mechanism as follows.

Waveform Capture

Referring to FIG. 2, waveform-capture operation 50 consists of sampling and storing a portion of the distorted sinusoidal signal received by analyzer input 48 in digital memory. To be stored, the signal must be a series of digital values or samples representing the distorted sinusoidal signal. Therefore, when the analyzer input signal is analog, the analyzer input includes A/D conversion. The target distortion device and entire signal chain require time to stabilize after starting the sinusoid generator. This lets start-up transients pass before beginning to store the analyzer input signal. Once the waveform-capture operation begins, enough signal is stored to ensure that at least two complete cycles of the waveform is captured. This operation may be performed manually using a computer based digital audio recording system or similar device intended for recording digital audio. The preferred method integrates this operation into the apparatus that performs the remainder of the distortion modeling process, simplifying the total process and making automation possible.

Waveform Segment Selection

After the waveform is captured, waveform-segment-selection operation 52 isolates a single cycle of the waveform. The waveform segment must contain precisely one cycle in order for the subsequent Fourier transform to yield accurate harmonic parameters. Selecting a frequency for sinusoid generator 30 that produces an integer number of samples per cycle affords the highest accuracy, especially when the sinusoid generator and waveform capture apparatus use the same time base.

Figure 16:
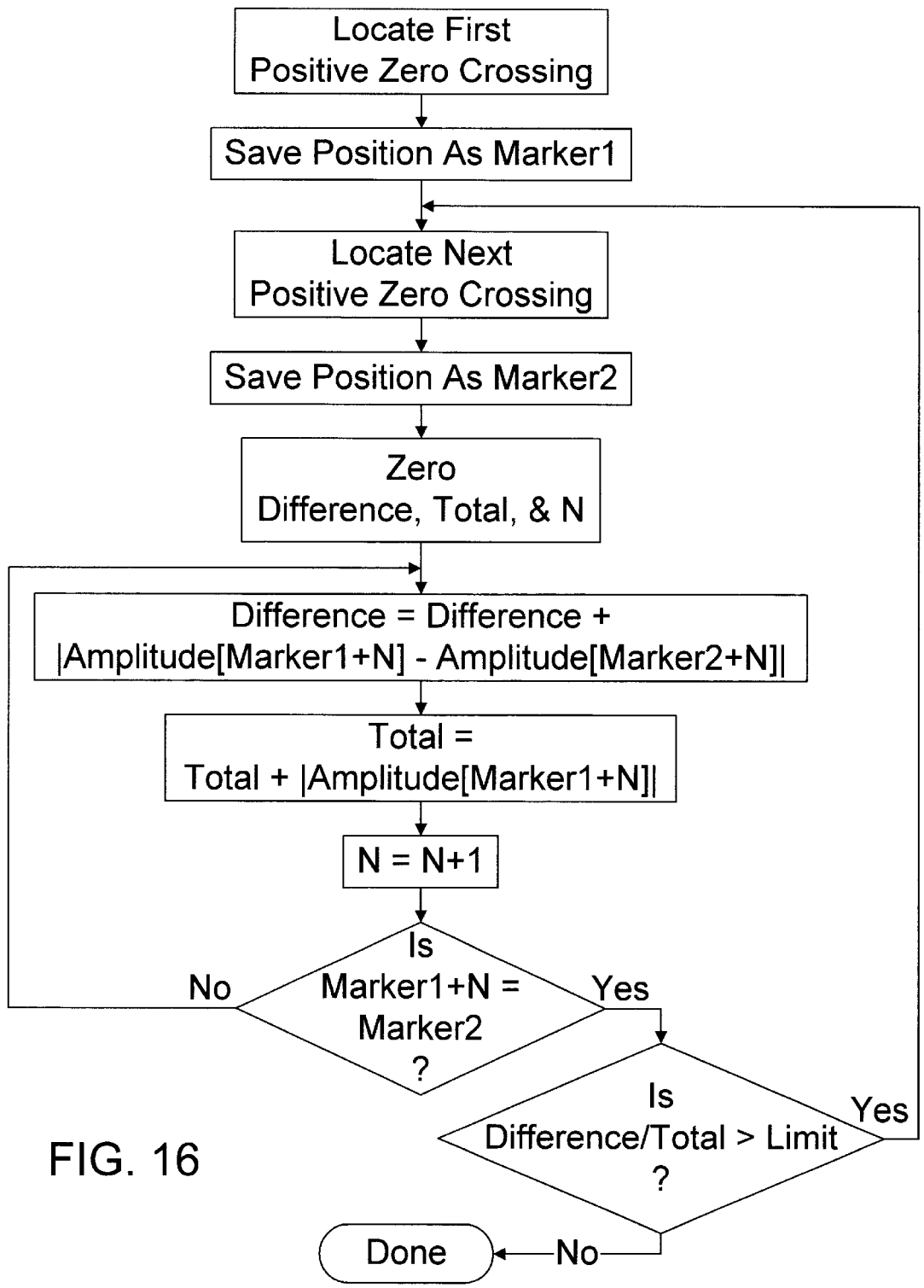
FIG. 16 is a flowchart of the Waveform-Segment Selection section shown in FIG. 2.

The waveform-segment-selection operation may be performed manually using a computer based digital audio editor or similar device intended for manipulating digital audio. The preferred method is an automated process integrated into the apparatus of the present invention. FIG. 16 shows a flowchart of a program that automates the operation. Upon completion, the program variable Marker1 contains the address of the first memory location of the selected single cycle within the captured waveform. Marker2 contains the address of the first memory location of the following cycle, one location beyond the end of the selected cycle. This program is able to isolate a single cycle of a repetitive waveform regardless of how many zero crossings occur within the cycle. It operates on the premise that two identical waveform segments cancel each other when one is inverted and added to the other. The program variable Limit, a user-supplied value, allows for some error in the cancellation process due to normal variations in the sampling process and noise. In order for the program to function properly, the captured waveform must have zero crossings and contain some of the original fundamental frequency.

Normalize Amplitude

Referring again to FIG. 2, the amplitude of the waveform segment is normalized to unity by amplitude-normalization operation 56. Normalization prepares the waveform segment for the Fourier transform. Normalization also ensures that the resulting distortion model uses the full dynamic range of the distortion synthesizer. The waveform segment is first examined to find the maximum absolute amplitude value. Then each amplitude value in the waveform segment is divided by the maximum absolute amplitude value, generating normalized waveform segment 58.

Fourier Transform

The next step is to perform a Fourier transform on the normalized waveform segment. The resulting parametric data represent the harmonic amplitude and phase characteristics of the distorted sinusoidal signal. Most forms of the fast Fourier transform (FFT) require the number of data points or the data length to be a power of two. This requirement can be met if the sinusoidal waveform supplied to the target distortion device is of an appropriate frequency in proportion to the sampling rate of the waveform-capture operation. However, this severely limits the frequencies available for the modeling process. The frequency must also be very accurate, which may not be possible for all implementations. The well-known technique of using windowing to reduce the effects of mismatched data length and waveform cycle length introduces error that reduces the accuracy of the resulting distortion model.

In view of the limitations imposed by the FFT, the direct form of the discrete Fourier transform (DFT) is preferred since it places no restrictions on the data length. The DFT is well known in the art of digital signal processing (DSP) and details of its operation are not repeated here. As implemented in the prototype of the present invention, the DFT yields a sine and cosine part for each harmonic. The amplitude and phase parameters of each harmonic are derived from the sine and cosine parts using techniques well known in the art of DSP. The amplitude of harmonic zero is halved to compensate for an anomaly of the DFT. The DFT is structured such that each harmonic is completely resolved before moving to the next higher one, rather than resolving all harmonics simultaneously. The user can stop the process at any harmonic. This can greatly reduce the processing time, since the higher harmonics usually have negligible amplitudes and are eliminated from the distortion model anyway. Other methods exist for transforming time-domain data into the frequency domain. One skilled in the art of DSP may find other suitable methods of extracting the harmonic information from the captured waveform.

Phase Correction

The distortion synthesis method of the present invention depends upon a distortion model containing accurate harmonic amplitude and phase parameters to faithfully synthesize the distortion of the modeled distortion device. It must be stressed that phase accuracy is just as important as amplitude accuracy. To understand the role of phase as it applies to distortion modeling, one must examine the effects of distortion at varying signal amplitudes. During the synthesis process, a given harmonic of the model produces the pure harmonic of a unity-amplitude, sinusoidal input signal. At lower amplitudes, lower-numbered, like-order (even or odd) subordinate harmonics are produced along with the primary (model) harmonic. The primary harmonics of the model and their subordinate harmonics interact, either reinforcing or canceling each other, depending on their phases. Therefore, two distortion models having the same harmonic amplitudes but different phases produce very different harmonic content at less-than-unity signal amplitudes.

A distortion model of an amplifier experiencing clipping further demonstrates the effect of phase. When the clipping is severe, the model has a relatively high harmonic content. However, when using the model for distortion synthesis, no distortion is produced at signal levels below the model's clipping threshold. At the lower signal levels, the harmonics being produced cancel each other due to their phase relationships.

Most distortion devices experience phase shift in the signal path after the non-linear element due to coupling capacitors, tnansformers, filters, and the like. The waveform-capture operation may cause further phase shifting due to coupling capacitors and the anti-aliasing filter in the A/D conversion circuitry. For the synthesis to be accurate, it is imperative that the phase parameters of the distortion model represent only the non-linear element of the target distortion device. Therefore, the distortion modeling process includes the ability to compensate for the phase shifting discussed above. If no phase shifting has occurred, the parametric data obtained in the previous step is ready for use as a distortion model in its present form. Otherwise, the phase-correction operation needs to be performed.

For analysis, the signal path elements that introduce the phase shifts can be treated as filters. The phase response of a filter is a continuous function of frequency. This relationship makes it possible to estimate the phase shift at a specific frequency, after establishing the trend. This is the first critical factor in being able to compensate for phase shift.

When a non-linear element distorts a sinusoidal signal, the waveform of the resulting distorted sinusoidal signal is symmetrical. The nature of the symmetry depends on whether the evaluation is based on a sine or cosine wave. If a sine wave is used, the first and second quadrants of the distorted waveform are symmetrical and likewise are the third and fourth quadrants. Similarly, if a cosine wave is used, the two halves of the distorted waveform are symmetrical. The significance of the symmetry is that the harmonics of such a waveform can have only two possible phase values. In the sine wave case, the phases of odd harmonics are either zero or $\pi$ and the phases of even harmonics are either $+\pi/2$ or $-\pi/2$. The phase is specified in radians. In the cosine wave case, the phases of all harmonics are either zero or $\pi$. This unique phase property is the second critical factor in being able to compensate for phase shift.

Figure 17A:
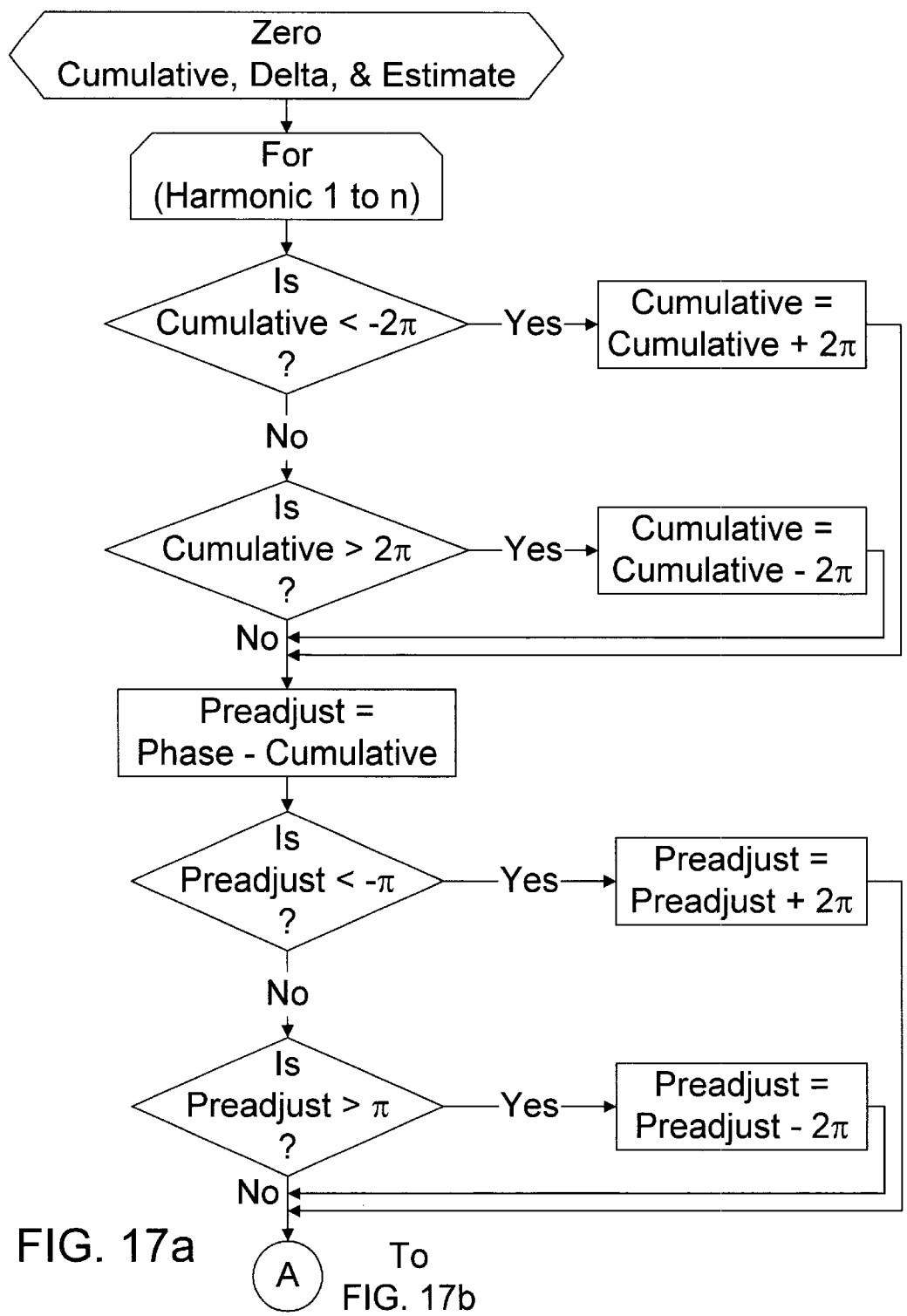
FIG. 17 is a flowchart of the Phase Correction section shown in FIG. 2, consisting of FIG. 17a and FIG. 17b.
Figure 17B:
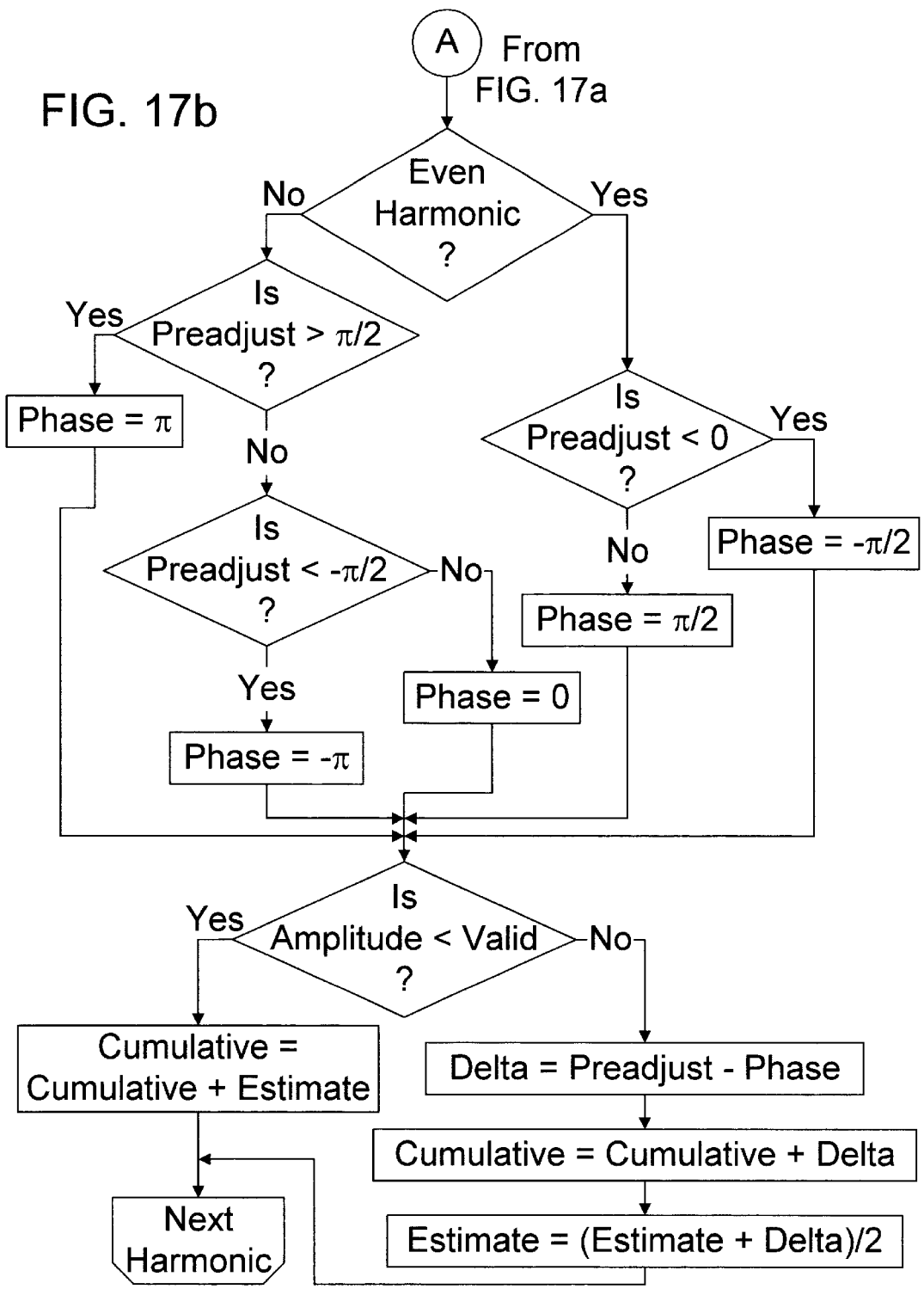

FIG. 17 shows a flowchart of a program that performs the phase-correction operation 64 of FIG. 2. The resulting phase-corrected harmonics are in sine form. The program can correct up to $\pm\pi/2$ radians of phase shift for each successive harmonic relative to the previous harmonic. Harmonic zero, which is the DC component, is left unchanged since its phase parameter is irrelevant. Starting at harmonic one and working upward, each harmonic's phase is preadjusted by a cumulative phase shift value. It is further adjusted to the nearest of the two phase values that are valid for that harmonic. The amount of the second adjustment is added to the cumulative value. If a harmonic's amplitude is very low, its phase may have a random, invalid value. Such a harmonic may corrupt the phase-correction operation. Therefore, a harmonic's amplitude must be above a user specified value, the program variable Valid, in order for its phase to be used to update the cumulative value. Otherwise, the cumulative value is updated with an estimate based on previous valid harmonics.

As previously mentioned, the harmonics of the distortion model are in sine form. The sine form is preferred as it is generally easier to understand intuitively than the cosine form. Some implementations of the distortion synthesizer may require that the distortion model be in cosine form. For such cases, the distortion model can be converted to cosine form by changing the phase parameters as follows:

TABLE 1

| | Sine | → | Cosine |
|---|---|---|---|
| Harmonic 1, 5, 9, . . . | 0 | | 0 |
| Harmonic 1, 5, 9, . . . | $\pi$ | | $\pi$ |
| Harmonic 3, 7, 11, . . . | 0 | | $\pi$ |
| Harmonic 3, 7, 11, . . . | $\pi$ | | 0 |
| Harmonic 2, 6, 10, . . . | $+\pi/2$ | | $\pi$ |
| Harmonic 2, 6, 10, . . . | $-\pi/2$ | | 0 |
| Harmonic 4, 8, 12, . . . | $+\pi/2$ | | 0 |
| Harmonic 4, 8, 12, . . . | $-\pi/2$ | | $\pi$ |

Also, one skilled in the art of DSP could modify the Fourier transform and phase-correction operations to change the native form of the distortion models to cosine.

After the phase-correction operation, the distortion model is complete. The basic distortion model contains a series of harmonic amplitude and phase parameters, starting with harmonic zero. Amplitude parameters are linear and unity represents full scale. Phase is in radians. The sign of harmonic zero determines the polarity of the DC component of the distortion model. The prototype of the present invention uses the distortion model in its native form as previously described. It is possible, however, to convert the data of the distortion model into a more compact form. Since a valid phase can have only two possible values, phase can be encoded into the amplitude parameter as its sign.

Harmonic Editor and Data Storage

Referring again to FIG. 1, the completed distortion model may be used by the distortion synthesizer, edited with the harmonic editor, or stored for later use. The harmonic editor displays the harmonic parameters of a distortion model and enables the user to modify them. As implemented in the prototype of the present invention, the distortion model to be edited is loaded from disk into system memory. The harmonic amplitude parameters are displayed as a bar graph. An individual harmonic can be selected to numerically display its amplitude and phase parameters. Amplitude is displayed in decibels and phase is displayed in degrees. The selected harmonic's amplitude and phase can be modified as desired. For large-scale editing, a cutoff harmonic can be specified, disabling all harmonics above the cutoff. A threshold amplitude can be specified, disabling all harmonics whose amplitude is below the threshold. The cutoff and threshold values become part of the distortion model. When the editing is complete, the modified distortion model is stored on the disk.

Multiple distortion models can be stored in data-storage device 40 and retrieved as needed for use by the distortion synthesizer or harmonic editor. Various types of non-volatile data-storage devices may be used, depending on the implementation of the present invention. This includes, but is not limited to, magnetic and optical computer-data-storage devices, battery-backed memory devices, programmable memory devices, and electrically reprogrammable memory devices.

It is likely that distortion models created on an apparatus of the present invention at one location will be used for distortion synthesis on a related apparatus at a different location. More specifically, an apparatus may have distortion synthesis capabilities according to the present invention while not having distortion modeling capabilities, instead using stored distortion models supplied by the manufacturer. Therefore, it should be understood that the modeling and synthesis portions of the present invention are not restricted to the same apparatus.

Arbitrary Distortion Model

Figure 19A:
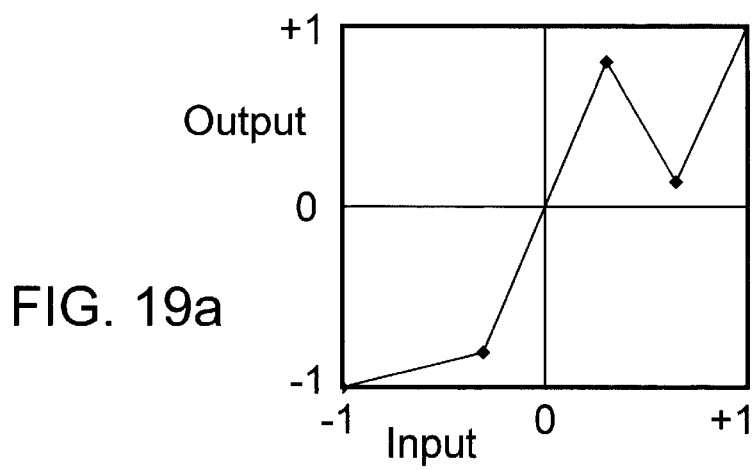
FIG. 19a shows a graph of an arbitrarily created transfer function.

At this point, a special case of distortion modeling is described. The prototype of the present invention provides a method for creating an arbitrary distortion model. Implementation on a general-purpose computer provides a graphical user interface. A view is provided to design a graph comprising a series of connected straight line segments, where the graph represents a transfer function. The x-axis represents the input signal and the y-axis represents the output signal. The resulting curve can have any shape, within these limitations: The curve must define y-axis values for all x-axis values and each x-axis value can have only one y-axis value. An example of a curve created using this method is shown in FIG. 19a.

The transfer function represented by the graph serves as the target distortion device and undergoes the distortion modeling operation much the same as previously described. Since the target distortion device exists within the same apparatus as the distortion analyzer, some modifications to the distortion analyzer are appropriate. The sinusoid generator produces only one cycle of a sine wave, with each successive sine value being translated according to the graph and stored in memory. Since this produces exactly one cycle of distorted waveform, no waveform-segment-selection operation is necessary. The amplitude-normalization operation is omitted, as the graph can be designed to use the full output range. The Fourier transform is performed as previously described. The resulting harmonic amplitude and phase parameters are usable as a distortion model without the phase-correction operation, as no phase shifting occurs in any of the operations.

Arbitrary distortion models can also be created with the harmonic editor. In this case, the amplitude and phase parameters of the distortion model are arbitrarily specified by the user. The ability to create arbitrary distortion effects is enticing for experimentation purposes. However, the natural distortion of a real-world, analog distortion device tends to have qualities that cannot be achieved by a contrived distortion effect. This underscores the significance of the present invention's ability to derive distortion models directly from analog distortion devices. It is virtually impossible to duplicate the distortion of a specific distortion device by selecting harmonic amplitude and phase parameters by trial and error.

Distortion Synthesizer

Referring to FIG. 3, the operation of distortion synthesizer 44 is described. The core element of the distortion synthesizer is distortion function 68, which performs a non-linear transformation of the input signal. The distortion function uses the harmonic amplitude and phase parameters of distortion model 36 to approximate the transfer characteristics of the non-linear element of the target distortion device used to create the distortion model. The accuracy of the approximation depends on the number of harmonics preserved by the distortion modeling operation. Also, as the distortion synthesis is a digital process, it is subject to the usual limitations imposed by a discrete-time, quantized system.

Preferred Distortion Function

It is well known that any complex, repetitive signal can be constructed by adding harmonically related sine waves having the appropriate amplitudes and phases. Similarly, the distorted sinusoidal signal used to create a distortion model can be reconstructed from the model. The reconstructed signal would reflect any phase changes made to the distortion model during the phase correction process. Furthermore, since it is known that the distortion model was derived from a signal that originated as a pure sinusoidal signal, it is also possible to reconstruct the transfer characteristics of the non-linear element that distorted the sinusoidal signal. The distortion function used by the distortion synthesizer performs such a reconstruction and applies the transfer characteristics to a digital signal.

The preferred distortion function as developed for the present invention follows. The distortion function of expressed as a function of input signal x is:

$$f(x) = a_0 + \sum_{k=1}^{n} a_k(\sin((k(\sin^{-1}x)) + \phi_k)) \qquad \text{Expression (1)}$$

where:
n is the highest harmonic of the distortion model
$a_o$ is the amplitude of harmonic zero of the distortion model
$a_k$ is the amplitude of the $k^{th}$ harmonic of the distortion model
$\phi_k$ is the phase of the $k^{th}$ harmonic of the distortion model
x is the input signal, normalized to the range of −1.0 to +1.0.

The distortion function expression accepts linear amplitude parameters and radian phase parameters from the distortion model in its native sine form. This form of distortion function is also referred to in this document as a weighted sum of sines of harmonic arcsines. The expression can be converted to work with the cosine form of the distortion model by replacing the sin and sin $^{-1}$ terms with cos and cos $^{-1}$, respectively. If the cosine form is used and each harmonic's phase is encoded as the amplitude sign, the $\phi_k$ term can be eliminated to improve calculation efficiency. When the phase is zero, the amplitude is positive and when the phase is $\pi$, the amplitude is negative. The cosine form of distortion function is also referred to in this document as a weighted sum of cosines of harmonic arccosines.

Chebyshev Polynomials

A class of polynomials known as Chebyshev polynomials of the first kind specifically relates to the generation of individual harmonics with non-linear functions. The wave-shaping synthesis techniques mentioned in the Description of Prior Art references of Le Brun and Chamberlin make use of these polynomials. Their usage is covered extensively in the prior art and is not repeated here. These polynomials can be used as an alternative to the distortion function shown in Expression (1). The distortion function that uses the polynomials follows. The distortion function f expressed as a function of input signal x is:

$$f(x) = a_0 + \sum_{k=1}^{n} a_k T_k(x) \quad \text{Expression (2)}$$

where:

$$T_{k+1}(x) = 2xT_k(x) - T_{k-1}(x) \quad \text{Expression (3)}$$

n is the highest harmonic of the distortion model $a_0$ is the amplitude of harmonic zero of the distortion model $a_k$ is the amplitude of the $k^{th}$ harmonic of the distortion model x is the input signal, normalized to the range of −1.0 to +1.0

Expression (3) recursively calculates the polynomials $T_k(x)$ for each successive harmonic. The distortion function of Expression (2) requires the distortion model to be in cosine form with each harmonic's phase encoded as the amplitude sign. This form of distortion function is also referred to in this document as a weighted sum of Chebyshev polynomials.

Distortion Function Comparison

The distortion functions of Expression (1) and Expression (2) have unique properties that may make one more appropriate for a specific implementation than the other. The distortion function of Expression (1) is simple and easy to implement, provided the trigonometric functions are available. Since it has an explicit phase term, it can accept distortion models that have not had their phase parameters corrected. This makes it possible to analyze and demonstrate the effect of phase correction. Also, there is no interdependence between harmonics when performing the calculations, making it possible to skip over unwanted harmonics. For example, the hundredth harmonic can be directly calculated, requiring no more calculations than the first harmonic. The distortion function of Expression (2) uses progressively higher-order polynomials for each harmonic. However, the calculations can be performed recursively as shown by Le Brun, where the calculation of each harmonic makes use of the preceding calculations for efficiency. Of primary significance, it requires only basic math functions, making it more appropriate for implementations where high-accuracy trigonometric functions are not available.

The two distortion functions, while being mathematically different, apply the same distortion to a signal when using equivalent distortion models. It is conceivable that additional functions can be derived that essentially produce the same results. It should be understood that such functions can be used without departing from the spirit of the present invention.

Distortion Function Application

The distortion function is applied to the input signal either by direct calculation or by using a look-up table containing precalculated values. The look-up table is built in a memory array by performing the distortion function calculations and necessary scaling on a series of values that spans the input range. The efficiency of the look-up table comes at the expense of possibly introducing some error into the signal. Any processing prior to applying the distortion function, such as amplification or filtering, results in values that must be truncated or rounded to be used with the look-up table. Linear interpolation can be used to reduce the errors. Linear interpolation also enables the use of a look-up table containing fewer entries than the number of possible input signal values.

The direct calculation method eliminates the errors associated with the look-up table but requires considerably more calculations. Direct calculation also reduces memory requirements since it eliminates the look-up table. In addition, the distortion model parameters can be modified during the distortion synthesis process to dynamically alter the distortion effect. The input signal is normalized before applying the distortion function and scaled afterward to the word size of the digital audio format. To improve the efficiency of direct calculation, Chebyshev polynomials whose coefficients are weighted according to the distortion model are added to form a single, composite polynomial. The degree of the composite polynomial is equal to the highest harmonic of the distortion model. Each term above the first degree term requires only one multiplication to calculate the exponential expression and one multiply-accumulate operation to apply the coefficient and perform the summation. This form is well suited for implementation on a general-purpose DSP device.

The prototype of the present invention uses a look-up table for applying the distortion function. It is scaled to work with 16-bit digital audio, so the look-up table contains 16-bit values for each of the 65,536 possible input values. Floating-point, 64-bit processing is used throughout. The signal values are rounded before applying the distortion function, introducing a worst-case error of one-half of one least-significant bit (LSB). The look-up table is built using the distortion function of Expression (1). In accordance with the earlier description of the distortion model, harmonics above the cutoff value or having amplitudes below the threshold value are omitted from the calculations.

Input and Output Amplifiers

Referring again to FIG. 3, input amplifier 66 provides the ability to control the amplitude of the digital input signal before applying the distortion function. Since the distortion effect varies with amplitude, the input amplifier has variable gain to give the user additional control over the distortion. Output amplifier 72, which also has variable gain, provides compensation for gain introduced by the distortion function and provides signal level adjustment for subsequent processing. The input and output amplifiers operate by multiplying their input signal values by user-supplied gain factors. The amplifiers are not essential to the operation of the distortion synthesizer but they do add utility.

Hardware Implementation

Various hardware approaches can be taken to implement the present invention. A general-purpose computer can be used, provided it is equipped to send and receive audio signals. Other possible implementations may be based on one or more of the following devices: microprocessor; microcontroller; digital signal processor; application-specific integrated circuit (ASIC); programmable logic device (PLD); or other logic devices. Distortion synthesis processing can be batch or real time, as the hardware implementation permits. Even though the present invention focuses on audio signals, its methods can be applied to other types of signals that benefit from non-linear processing.

Example Graphs

FIGS. 19a through 21c are graphs that demonstrate some of the basic features of the present invention. The graphs depict actual examples produced by the prototype of the present invention.

Figure 19B:
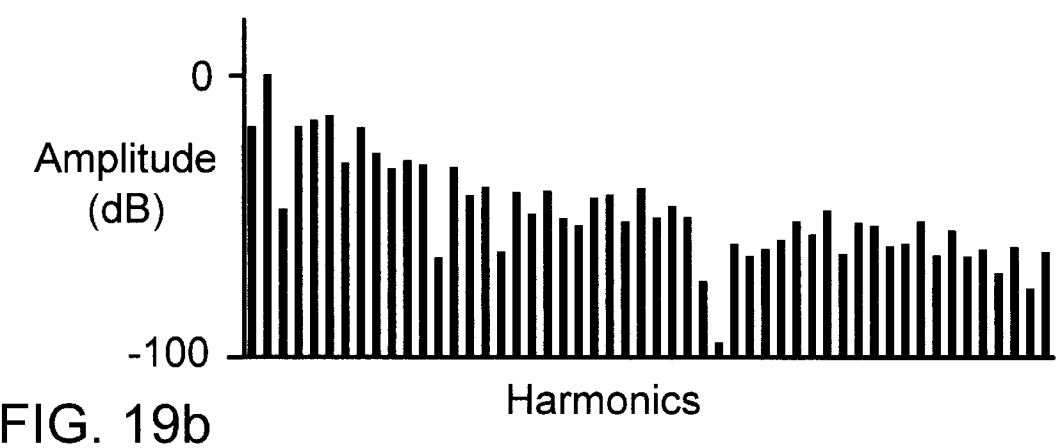
Figure 19C:
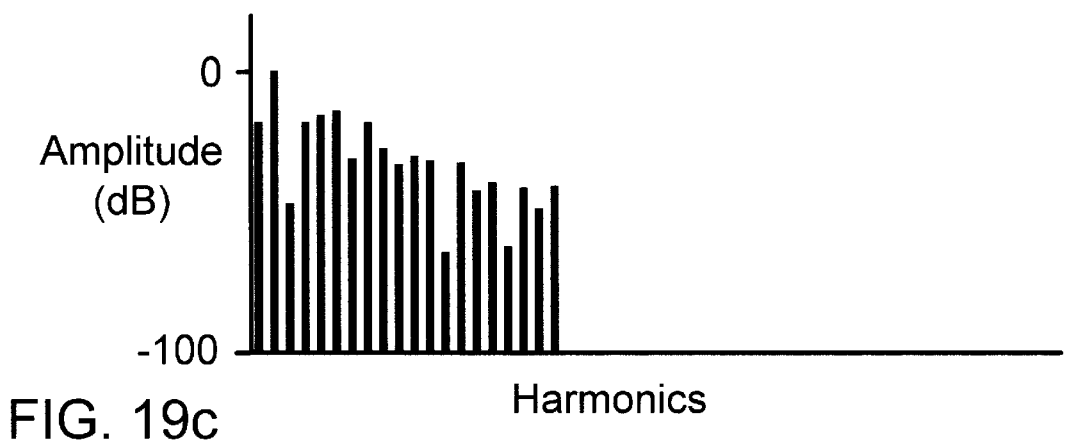
FIG. 19c shows a graph of the harmonic amplitudes of a modified version of the distortion model shown in FIG. 19b.
Figure 19D:
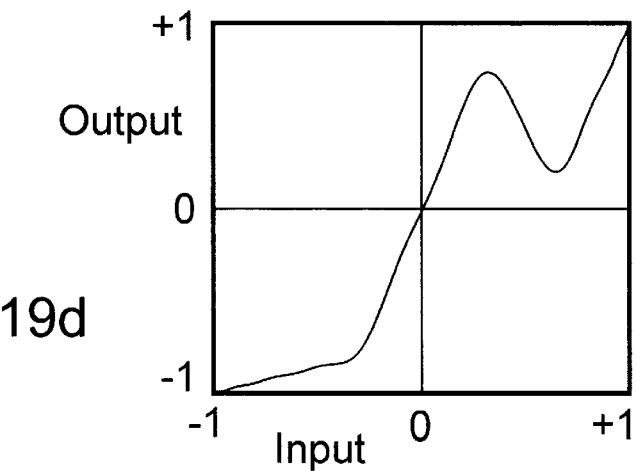
FIG. 19d shows a graph of the distortion function using the modified distortion model shown in FIG. 19c.

FIG. 19a is a graph of an arbitrary transfer function created as described in the Arbitrary Distortion Model section. The bar graph in FIG. 19b shows the amplitudes of the first fifty-two harmonics of the distortion model derived from the transfer function. The angularity of the transfer function accounts for the higher harmonics of the distortion model. The bar graph in FIG. 19c shows the harmonic amplitudes of a modified version of the distortion model shown in FIG. 19b. The harmonics above the nineteenth are eliminated. The phases of the harmonics are unchanged. FIG. 19d shows a graph of a distortion function using the modified version of the distortion model. Note the smooth curves in comparison to FIG. 19a. When the distortion model retains two hundred or more harmonics, a graph of the distortion function is virtually identical to FIG. 19a. A distortion function is graphed by applying the function to a linear series of signal values that spans the input range and plotting the results.

Figure 20A:
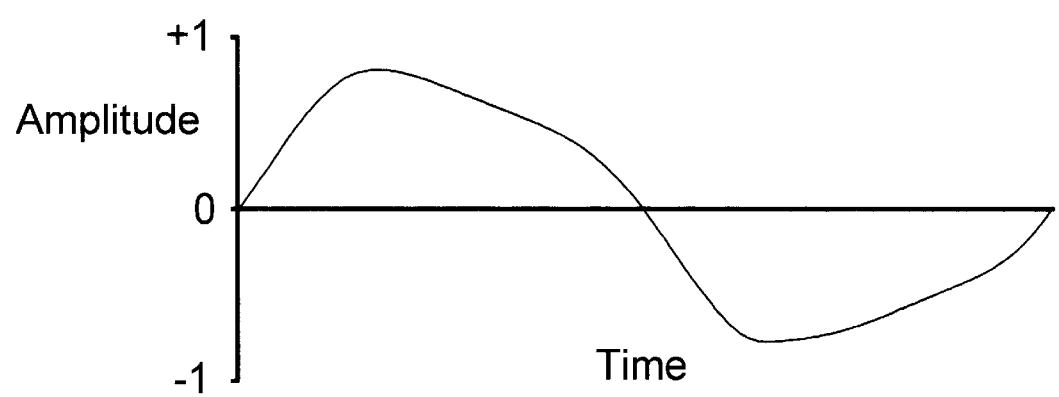
FIG. 20a shows a graph of a sine wave distorted by saturated analog recording tape.
Figure 20B:
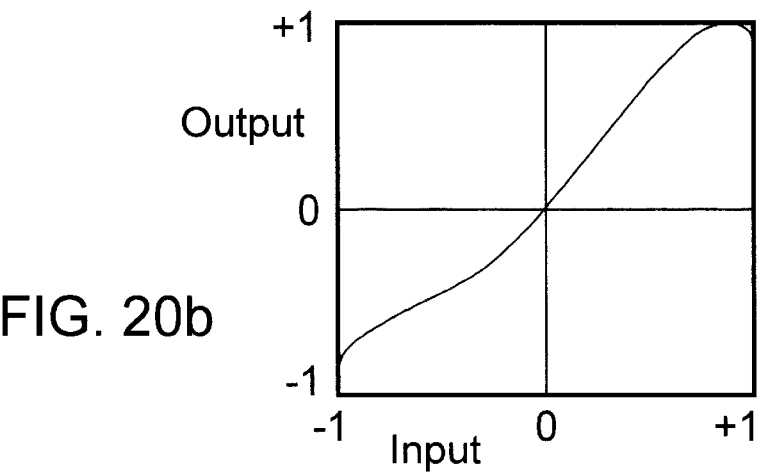
FIG. 20b shows a graph of the distortion function using a distortion model derived from the waveform shown in FIG. 20a without using phase correction.
Figure 20C:
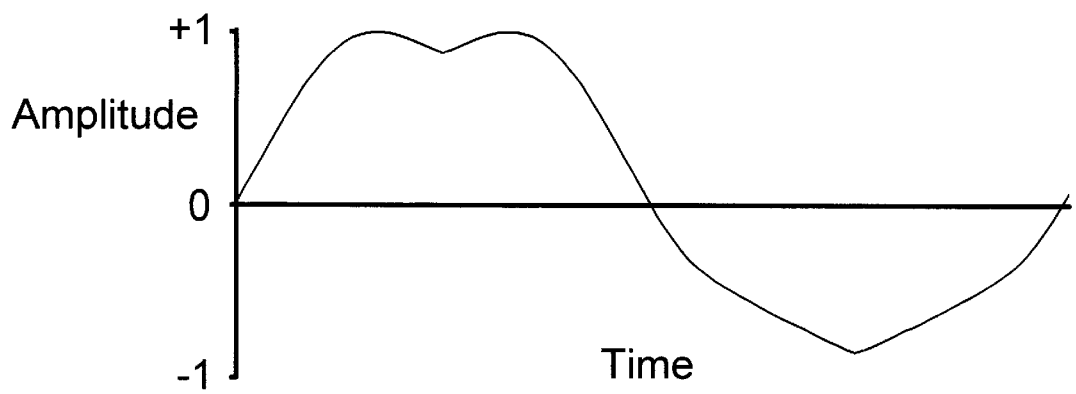
FIG. 20c shows a graph of a sine wave distorted by the distortion synthesizer of the present invention, using a distortion model derived from the waveform shown in FIG. 20a without using phase correction.
Figure 20D:
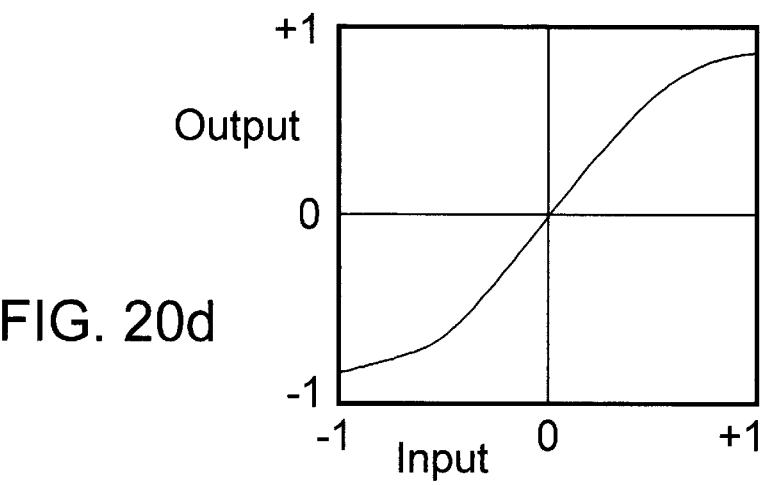
FIG. 20d shows a graph of the distortion function using a distortion model derived from the waveform shown in FIG. 20a using phase correction.
Figure 20E:
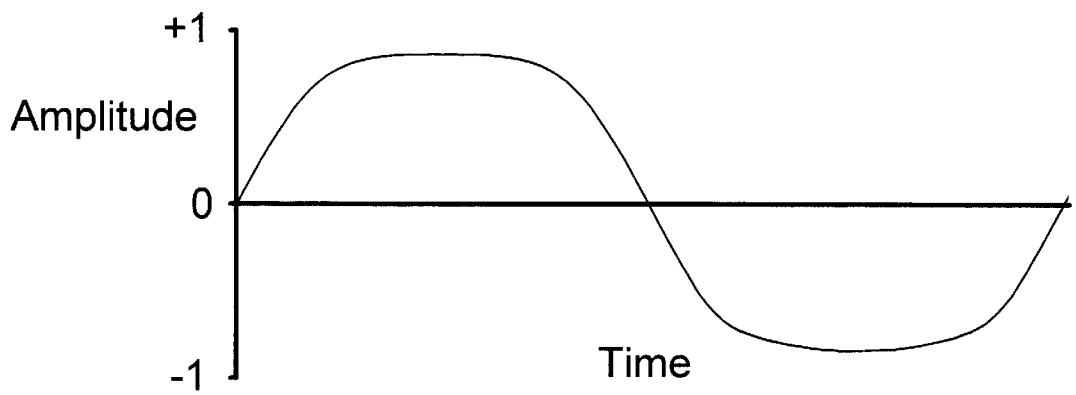
FIG. 20e shows a graph of a sine wave distorted by the distortion synthesizer of the present invention, using a distortion model derived from the waveform shown in FIG. 20a using phase correction.

FIG. 20a is a graph of a waveform segment containing one cycle of a sinusoidal signal distorted by an analog tape recorder. The tape recorder is operating at a recording level that drives the tape into saturation. The asymmetry of the waveform indicates that the signal experiences phase shifting in the signal chain after the non-linear element. The phase shifting is primarily due to the inductive playback head, with some additional phase shift being added by other circuitry in the tape machine and the A/D conversion circuitry used to capture the waveform. FIG. 20b shows a graph of a distortion function using a distortion model created from the waveform segment without using phase correction. The graph of FIG. 20c shows a sinusoidal waveform distorted by the distortion synthesizer using the same distortion model used to make FIG. 20b. Since phase correction is not used, the waveform of FIG. 20c does not exhibit the effect of tape saturation, either visibly or audibly. FIG. 20d shows a graph of a distortion function using a phase-corrected distortion model created from the waveform segment. The graph of FIG. 20e shows a sinusoidal waveform distorted by the distortion synthesizer using the same distortion model used to make FIG. 20d. This waveform clearly exhibits the effect of tape saturation but without the phase shifts.

Figure 21A:
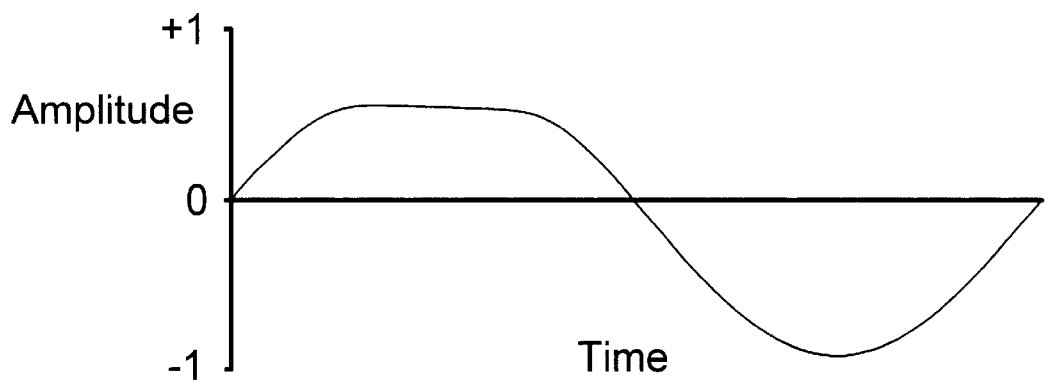
FIG. 21a shows a graph of a sine wave distorted by a vacuum tube driven into its cutoff region.
Figure 21B:
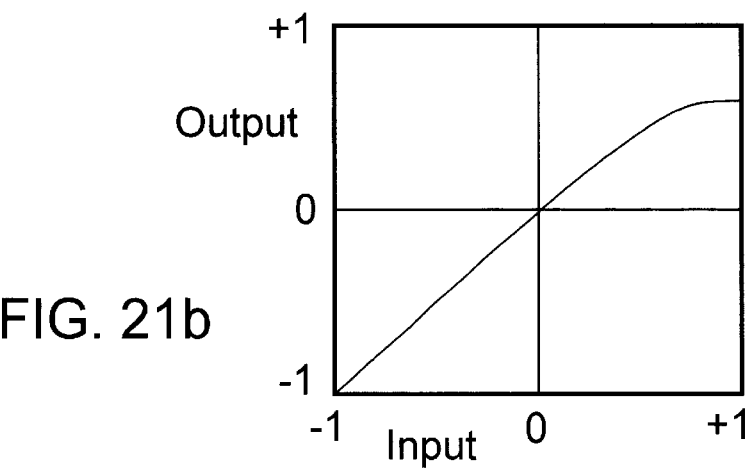
Figure 21C:
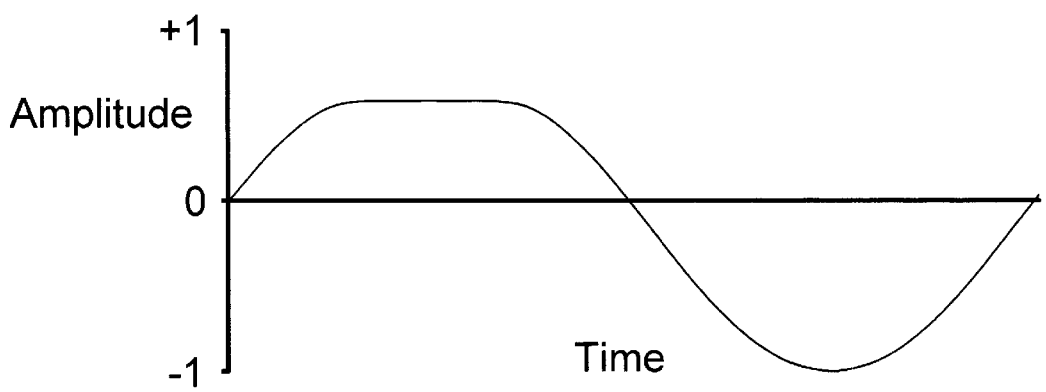

FIG. 21a is a graph of a waveform segment containing one cycle of a sinusoidal signal distorted by a single stage of a vacuum-tube amplifier. The vacuum tube is being driven into its cutoff region. The flattened portion of the waveform is slightly sloped, revealing phase shifts induced by capacitive coupling and the A/D conversion circuitry used to capture the waveform. FIG. 21b shows a graph of a distortion function using a phase-corrected distortion model created from the waveform segment. The graph shows a textbook-like depiction of a vacuum tube's transfer characteristics. The graph of FIG. 21c shows a sinusoidal waveform distorted by the distortion synthesizer using the same distortion model used to make FIG. 21b. The waveform shows an accurate reproduction of the vacuum tube's distortion but without the phase shifts.

OTHER EMBODIMENTS

Many of the additional embodiments of the present invention involve the suppression of aliasing noise. A discussion of aliasing noise and the methods used for its suppression is presented before the descriptions of the additional embodiments.

Aliasing-Noise Suppression

Figure 12:
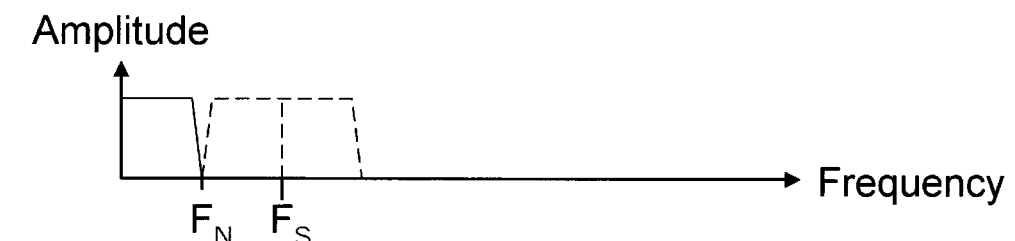
FIG. 12 is a graph showing the in-band spectrum of a sampled signal and its alias images.

FIG. 12 is a graph showing the in-band spectrum of a sampled signal and its alias images. The solid line shows the allowable in-band spectrum. Images or aliases of the in-band spectrum, shown by dashed lines, are produced as sidebands around the sampling rate, $F_S$. The in-band signal is band-limited to the Nyquist frequency, $F_N$, one-half of the sampling rate, to prevent the lower alias image from extending into the in-band spectrum.

When an analog distortion device distorts a signal, harmonics can be generated that are well beyond the normal hearing range of humans. If the distorted signal is digitized for recording or processing, the A/D converter's anti-aliasing filter removes the harmonics and other frequency content near and above the Nyquist frequency. When distortion is applied to a signal in the digital domain, the resulting harmonics can extend upward beyond the Nyquist frequency, causing the lower alias image to extend downward into the in-band spectrum. The reconstruction filter of the D/A converter removes the out-of-band portion of the alias images but the in-band portion remains as aliasing noise.

The formula for determining the maximum input frequency, $F_{MAX}$, that can have a given harmonic H added by distortion without inducing aliasing noise is:

$$F_{MAX} = \frac{F_S}{2H} \qquad \text{Expression (4)}$$

where:

$F_S$ is the sampling rate

H is the harmonic generated by distortion

Applying Expression (4) using the standard compact disc sampling rate of 44.1 kHz, if only second-harmonic distortion is produced, input frequencies above 11.025 kHz induce aliasing noise. Third-harmonic distortion lowers the aliasing threshold to 7.35 kHz, etc. This means that adding even just the second harmonic to a typical digital audio signal will produce some aliasing noise. Most types of distortion produce harmonics well beyond the second and third. Heavy distortion, such as that commonly used for electric guitars, can produce one hundred or more harmonics at audible amplitudes. Considering this, it is easy to see how digital distortion can suffer from aliasing noise. Even if the aliasing is not clearly recognizable, its presence contributes to listeners' negative impressions of digital distortion.

All the digital audio distortion devices discussed in the Description of Prior Art produce aliasing noise as previously described. The same holds true for the basic distortion synthesizer of the present invention as described in the Preferred Embodiment sections. Central to this property is the manner in which the non-linear transformation is performed. In all the stated cases, an output sample is calculated from a single input sample; prior or subsequent input samples have no bearing on the current output sample. To suppress aliasing noise, the non-linear transformation process must be enhanced to make it frequency dependent. As such, each output sample must be calculated from multiple input samples. Additional embodiments of the distortion synthesizer of the present invention use methods that give them this frequency-dependent property explicitly for suppressing aliasing noise.

As demonstrated by Expression (4), whether digital distortion produces aliasing noise or not depends on three inter-related factors:

A.) Distortion function harmonics

B.) Input-signal frequency content

C.) Sampling rate

The present invention includes methods for controlling these factors to limit or suppress aliasing noise. The underlying theory of the methods is discussed in the following sections.

Distortion Function and Distortion Model

This is not an additional embodiment but is an inherent property of the present invention that can reduce aliasing noise. The distortion function and related distortion model used by the distortion synthesizer allow precise control over the harmonics added by distortion. This level of control makes it possible to predict and, to a degree, control aliasing noise. The distortion model can be modified to eliminate or reduce the upper harmonics and, hence, the aliasing noise they would induce. The aliasing noise is not suppressed as such, but its production is reduced.

Bandsplitter

Referring again to FIG. 12, it can be seen that bandlimiting the input signal to a frequency substantially lower than the Nyquist frequency allows some space or headroom for the spectrum to be extended by distortion without causing aliasing noise. Expression (4) also shows that the number of harmonics that can be added by distortion without causing aliasing noise is inversely related to the frequency of the input signal. The distortion synthesizer of the present invention uses the bandlimiting of a bandsplitter to provide spectral headroom. A bandsplitter is used rather than just a lowpass filter to preserve the high-frequency content of the input signal. The distortion function is applied to the lowpass signal from the bandsplitter. A signal-combining mixer combines the highpass signal from the bandsplitter with the distorted signal. This method provides bandlimited distortion for aliasing-noise suppression without sacrificing a portion of the bandwidth of the input signal.

The audible effect that the bandlimiting has, besides reducing the aliasing noise, depends on the frequency characteristics of the input signal and the crossover frequency of the bandsplitter. The bandsplitter alters the distortion effect for signals having considerable high frequency content above the crossover frequency. Since the high frequencies are not distorted, less harmonics are added to the signal. Also, the high frequencies do not contribute to the intermodulation effects of distortion.

Multirate Processing

For a digital signal processing system, it may be necessary, for convenience or efficiency, to perform different portions of the process at different sampling rates. This is commonly known as a multirate system. The technique is well known in the digital signal processing literature and at least one full volume has been devoted to the subject: Multirate Digital Signal Processing—Crochiere and Rabiner, 1983. The distortion synthesizer of the present invention uses multirate processing to provide spectral headroom for suppressing aliasing noise.

Expression (4) shows that a higher sampling rate allows higher input frequencies and/or higher distortion function harmonics before aliasing occurs. It is not practical to operate a digital audio processing system at sampling rates significantly higher than those of the industry standards. It is possible, however, to convert the signal to a higher sampling rate for a portion of the process and then convert it back to the original rate. The distortion synthesizer of the present invention uses this technique to substantially extend the number of harmonics that can be added by distortion without causing aliasing noise. The sampling rate of the input signal is increased or up-converted using a DSP method known as interpolation. The distortion function is applied to the signal at the increased sampling rate. The sampling rate of the distorted signal is reduced or down-converted back to the original rate using a DSP method known as decimation.

Figure 13:
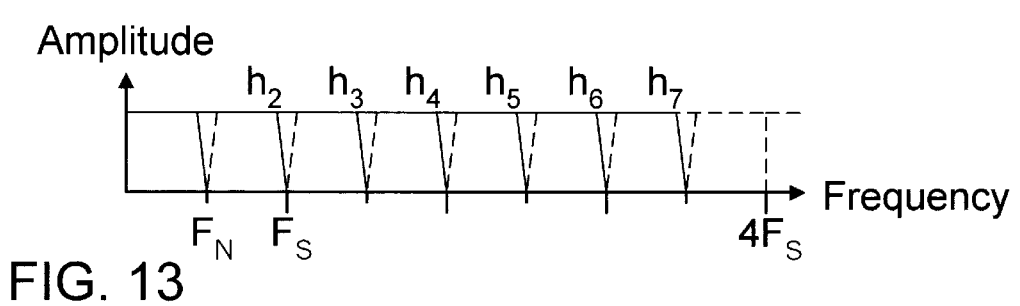
FIG. 13 is a graph showing the spectrum of an up-converted signal and its alias image where the spectrum is extended by harmonic distortion.

FIG. 13 is a graph showing the spectrum of an up-converted signal and its alias image where the spectrum is extended by harmonic distortion. The sampling rate has been increased by a factor of four. Solid lines show both the in-band spectrum of the input signal and the extended spectrum. Dashed lines show the lower alias image. The upper alias image is not shown. As in FIG. 12, the input signal is bandlimited to the Nyquist frequency. The graph illustrates how each successive harmonic produced by the distortion extends the spectrum and the alias image. Now seven harmonics can be added by distortion to the full frequency range of the input signal without extending the alias image into the in-band spectrum. When the distorted signal is down-converted, the out-of-band frequencies above the original Nyquist frequency are removed, resulting in a distorted signal free of aliasing noise.

The up- and down-conversion operations both use lowpass filters. The filter's stopband frequencies and attenuation levels determine the effectiveness of their aliasing-noise suppression. The formula for determining the maximum harmonic, $H_{MAX}$, that is attenuated by the full stopband amount of the up-and down-conversion filters is:

$$H_{MAX} = \frac{F_{S2} - F_{OUT}}{F_{IN}} \qquad \text{Expression (5)}$$

where:

$F_{IN}$ is the up-conversion stopband frequency $F_{OUT}$ is the down-conversion stopband frequency $F_{S1}$ is the input sampling rate $F_{S2}$ is the up-converted sampling rate $F_{S3}$ is the down-converted sampling rate $F_{IN}$ must be less than or equal to one-half of $F_{S1}$ $F_{OUT}$ must be less than or equal to one-half of $F_{S3}$ To give some examples, assume $F_{S1}$ equals $F_{S3}$ and both $F_{IN}$ and $F_{OUT}$ are one-half of $F_{S1}$ and $F_{S3}$. Applying Expression (5) for an up-conversion factor of four yields an $H_{MAX}$ of seven, which agrees with the graph of FIG. 13. An up-conversion factor of eight yields an $H_{MAX}$ of fifteen; an up-conversion factor of sixteen yields an $H_{MAX}$ of thirty-one, etc. Distortion devices generally produce higher harmonics as the input signal's amplitude increases. The distortion synthesizer of the present invention produces all the harmonics in the distortion model only at the maximum input-signal amplitude. The highest harmonics rapidly diminish as the amplitude is lowered. In view of this, the harmonics in the distortion model may exceed $H_{MAX}$ somewhat without causing audible aliasing noise when using typical audio levels.

Multiple-stage Multirate Processing

In a multirate system, it may be advantageous to perform the sampling-rate conversion in two or more stages. The primary advantage is a reduction in the amount of computation needed. The technique is well known in the digital signal processing literature relating to multirate processing. The technique can be applied to the up- and down-conversion processes of the present invention for computational efficiency. However, a surprising additional advantage emerges when a separate distortion function is applied to each stage of up-converted signal. The total number of harmonics that can be added to the signal by the distortion functions without inducing aliasing noise increases dramatically, as compared to a single distortion function.

The formula for determining the maximum harmonic, $H_{MAX3}$, that is produced when using two stages of up-conversion and distortion is:

$$H_{MAX3} = H_{MAX1} \cdot H_{MAX2} \quad \text{Expression (6)}$$

where:

$H_{MAX1}$ is the maximum harmonic for the first stage of distortion $H_{MAX2}$ is the maximum harmonic for the second stage of distortion Expression (5) is employed again to calculate $H_{MAX1}$ and $H_{MAX2}$. $H_{MAX1}$ is calculated where $F_{IN}$ is the first up-conversion stopband frequency and $F_{S2}$ is the first up-converted sampling rate. $H_{MAX2}$ is calculated where $F_{IN}$ is the second up-conversion stopband frequency and $F_{S2}$ is the second up-converted sampling rate. The same $F_{OUT}$ is used for calculating both $H_{MAX1}$ and $H_{MAX2}$.

To give an example, assume $F_{S1}$ equals $F_{S3}$ and Four is one-half of $F_{S3}$. An up-conversion factor of four is used for each stage for a combined up-conversion factor of sixteen. When $F_{IN}$ for the first stage is one-half of $F_{S1}$, $H_{MAX1}$ is seven. The stopband frequency, $F_{IN}$, of the second up-conversion is usually set to the Nyquist frequency of the first up-converted sampling rate. However, lowering $F_{IN}$ to the same as that of the first stage increases $H_{MAX2}$ without losing any audible frequency content. For the example case, $H_{MAX2}$ is thirty-one. The resulting $H_{MAX3}$ is 217, compared to an $H_{MAX}$ of only thirty-one for an equivalent single stage. That is 217 harmonics being added to the signal without bandwidth limiting and without aliasing noise.

This method is especially suitable for applications requiring high distortion levels; the most common are distortion effects for electric guitars. A close parallel may be drawn with a multiple-stage vacuum-tube amplifier: a first, mildly distorted stage provides gain and drive for a second stage that adds heavier distortion. Using the appropriate vacuum tube distortion models, the present invention can accurately synthesize the distortion effect of such an amplifier. Also, the number of up-conversion and distortion stages is not limited to two.

Combined Methods

The bandsplitter method of suppressing aliasing noise increasingly alters the distortion effect as the bandsplitter's crossover frequency is lowered. The multirate method allows distortion of the full frequency range without altering the distortion effect. The computational requirement for multirate processing is higher than that of the bandsplitter, increasing as the up-conversion factor is raised. Combining the two methods increases computational efficiency while minimizing the alteration of the distortion effect. Any harmonics added to frequencies in the upper half of one's hearing range are inaudible, as they are ultrasonic. Therefore, when the crossover frequency of the bandsplitter is above the midpoint of the average hearing range, no audible harmonics from the distortion are lost.

Figure 14:
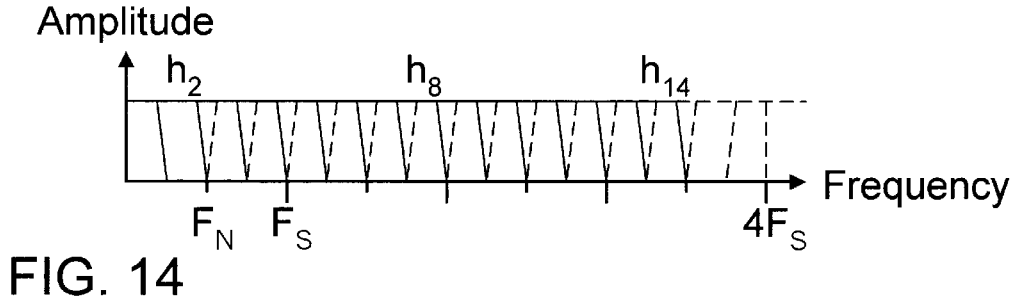
FIG. 14 is a graph showing the spectrum of a bandlimited, up-converted signal and its alias image where the spectrum is extended by harmonic distortion.

FIG. 14 is a graph showing the spectrum of a bandlimited, up-converted signal and its alias image where the spectrum is extended by harmonic distortion. As in FIG. 13, the sampling rate has been increased by a factor of four. Solid lines show both the bandlimited spectrum of the input signal and the extended spectrum. Dashed lines show the lower alias image. The upper alias image is not shown. The input signal is bandlimited by the bandsplitter to one-half of the Nyquist frequency, $F_N$. When the input signal's sampling rate, $F_S$, is the same as that of the compact disc standard, the crossover frequency of the bandsplitter is well above the midpoint of the average hearing range. Compared to FIG. 13, where up-conversion alone is used, twice as many harmonics can be added by distortion without extending the alias image into the in-band spectrum. This permits the use of lower up-conversion factors, reducing the computational requirement more than enough to compensate for the computation needed for the bandsplitter. The bandsplitter method can also be combined with the multiple-stage multirate method for similar efficiency gains.

The maximum harmonic, $H_{MAX}$, for the combined bandsplitter and multirate method is calculated as before using Expression (5) except the stopband frequency of the bandsplitter is substituted for $F_{IN}$. If multiple stages are used, $H_{MAX3}$ is calculated as before using Expression (6), substituting the stopband frequency of the bandsplitter for $F_{IN}$ when calculating $H_{MAX1}$ but not $H_{MAX2}$.

Distortion Synthesizer with Bandsplitter—Description

Figure 4:
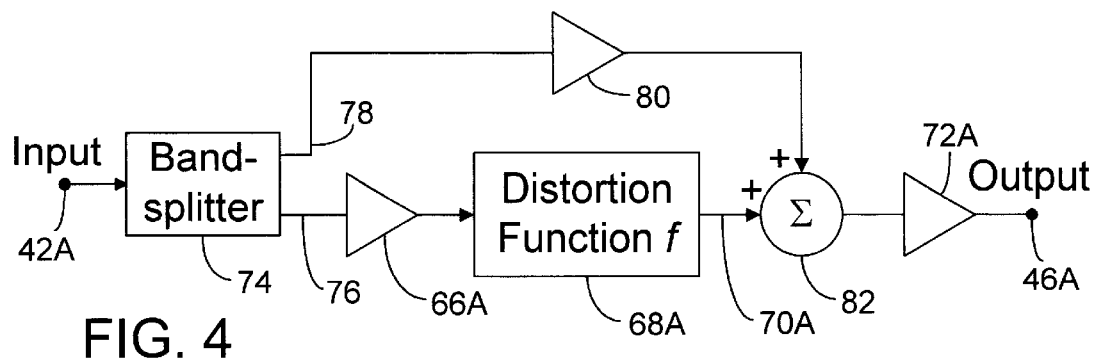
FIG. 4 is a block diagram of another embodiment of the distortion synthesizer shown in FIG. 1, in which a bandsplitter is used.

FIG. 4—Distortion Synthesizer with Bandsplitter

FIG. 4 is a block diagram of another embodiment of the distortion synthesizer shown in FIG. 1, in which a bandsplitter is used. A digital input signal 42A is received by the input of a frequency bandsplitter mechanism or bandsplitter 74. A lowpass output 76 of the bandsplitter is routed to the input of an input amplifier 66A. A distortion function 68A is applied to the output of input amplifier 66A, producing a distorted signal 70A. A highpass output 78 of the bandsplitter is routed to the input of a highpass amplifier 80. The output of highpass amplifier 80 is routed to the first positive input of a signal-combining mechanism or adder 82. Distorted signal 70A is routed to the second positive input of adder 82. The output of adder 82 is routed to the input of an output amplifier 72A that produces a digital output signal 46A.

Figure 5:
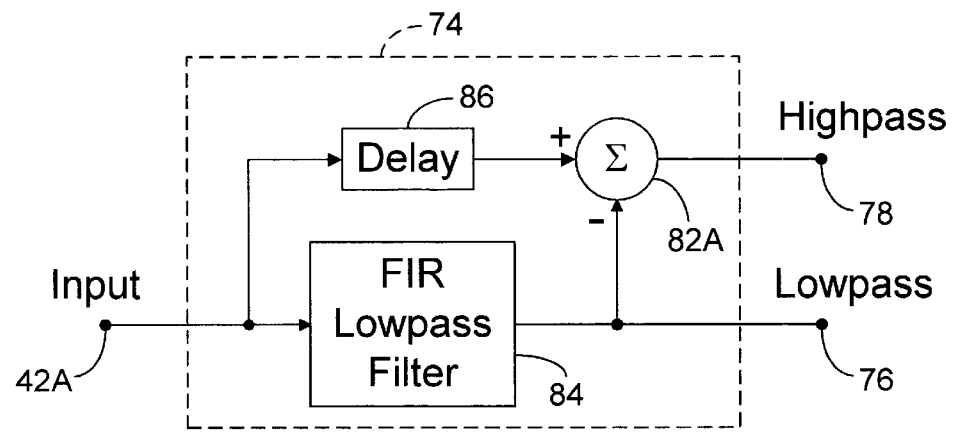
FIG. 5 is a block diagram of the bandsplitter shown in FIG. 4.

FIG. 5—Bandsplitter

FIG. 5 is a block diagram of the bandsplitter shown in FIG. 4. Digital input signal 42A is received by the input of a lowpass filter 84 and by the input of a signal delay mechanism or delay element 86. The output of lowpass filter 84 produces lowpass output 76 of the bandsplitter and is also routed to the negative input of an adder 82A. The output of delay element 86 is routed to the positive input of adder 82A. The output of adder 82A produces highpass output 78 of the bandsplitter.

Distortion Synthesizer with Bandsplitter—Operation

Operation of the distortion synthesizer with bandsplitter will be described further with reference to FIGS. 4 and 5.

Bandsplitter 74 is described first. Referring to FIG. 5, digital input signal 42A is received by the input of lowpass filter 84. The lowpass filter is a finite impulse response (FIR) digital filter. Although other types of digital filters can be used, the FIR type is preferred due to its linear phase characteristics when the filter coefficients represent a symmetrical impulse response. FIR digital filters are well known in the art of DSP and details of their operation are not repeated here. The cutoff frequency of the lowpass filter is made programmable by selecting from multiple sets of filter coefficients. Alternatively, the coefficients can be calculated for the desired frequency as needed.

Digital input signal 42A is also received by the input of delay element 86. The delay element, which is simply a first-in, first-out memory buffer, precisely matches the signal delay induced by the lowpass filter. The lowpass filter, as implemented in the prototype of the present invention, contains a buffer for input samples that also serves as the delay element. The number of filter coefficients or filter length, and hence the buffer length, are odd numbers. The sample in the center of the buffer is delayed by the same amount as the filter delay. The output of the lowpass filter is the lowpass output of the bandsplitter. The output of the lowpass filter is subtracted from the delayed input signal by adder 82A. The output of the adder is the highpass output of the bandsplitter. The bandsplitter loses none of the signal; summing the outputs reproduces a delayed but exact duplicate of the input.

FIG. 4 shows how the bandsplitter is integrated into the distortion synthesizer. The lowpass output of the bandsplitter is routed through input amplifier 66A and the highpass output is routed through highpass amplifier 80. The highpass amplifier, like the input amplifier, has variable gain. This arrangement permits balancing the high frequencies with the distorted signal, regardless of gain changes induced by the input amplifier and distortion function 68A. The input amplifier and distortion function operate the same as their counterparts previously described in the Preferred Embodiment—Operation section. The output of the highpass amplifier is added to the distorted signal by adder 82, combining the two signals. The combined signal is routed through output amplifier 72A, which operates the same as the output amplifier described in the Preferred Embodiment—Operation section.

Since the signals being combined by the adder have no phase or time differences, the output has a flat amplitude response across the full frequency range, provided the gain of the highpass amplifier is set properly. This is in contrast to other bandlimiting methods that use a lowpass filter instead of a bandsplitter. Just mixing some of the input signal with the filtered and distorted signal cannot attain a flat response.

A special class of distortion device, commonly referred to as a spectral enhancer, adds harmonic distortion only to frequencies in the upper mid-range and above. The distortion synthesizer with bandsplitter can be easily modified to function as a spectral enhancer. The bandsplitter's outputs are simply reversed so that the highpass output has distortion applied while the lowpass output bypasses the distortion. This is done by either rerouting the bandsplitter's outputs or by replacing the bandsplitter's filter coefficients to make it a highpass filter. To regain some aliasing-noise suppression, a bandpass filter can be used instead of a highpass filter.

Multirate Distortion Synthesizer—Description

Figure 6:
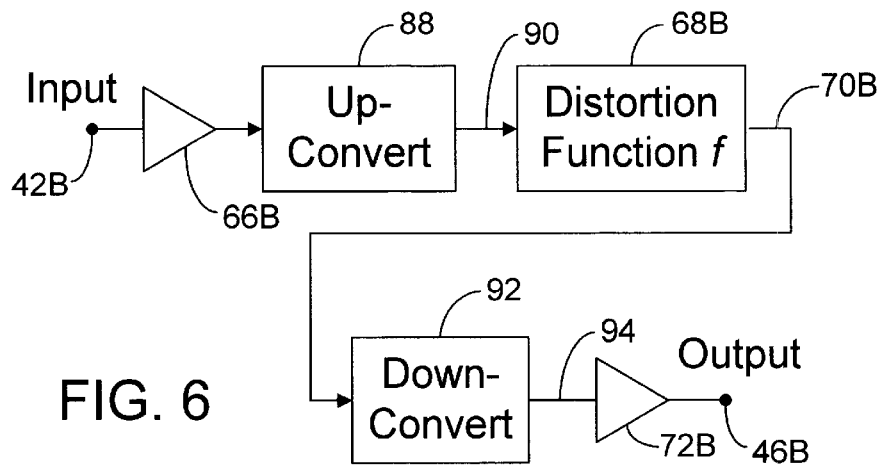
FIG. 6 is a block diagram of another embodiment of the distortion synthesizer shown in FIG. 1, in which sampling-rate conversion is used.

FIG. 6—Multirate Distortion Synthesizer

FIG. 6 is a block diagram of another embodiment of the distortion synthesizer shown in FIG. 1, in which sampling-rate conversion is used. A digital input signal 42B is received by the input of an input amplifier 66B. The output of input amplifier 66B undergoes a sampling-rate increase or up-conversion 88, producing an up-converted signal 90. A distortion function 68B is applied to the up-converted signal, producing a distorted signal 70B. The distorted signal undergoes a sampling-rate decrease or down-conversion 92, producing a down-converted signal 94. The down-converted signal is routed to the input of an output amplifier 72B that produces a digital output signal 46B.

Multirate Distortion Synthesizer—Operation

Operation of the Multirate Distortion Synthesizer will be Described Further with Reference to FIG. 6.

Digital input signal 42B is routed through input amplifier 66B, which operates the same as the input amplifier described in the Preferred Embodiment—Operation section. The sampling rate of the signal is up-converted to a substantially higher rate by up-conversion 88. The up-conversion process, commonly known as interpolation, preserves the frequency content of the original signal without introducing any new, extraneous frequency content. An interpolation filter performs the up-conversion process; simple linear interpolation is inadequate for this task. Interpolation, as it applies to sampling-rate conversion, is a technique well known in the art of DSP and details of its operation are not repeated here. In essence, new samples with zero values are inserted between the input samples to achieve the new sampling rate. The discontinuities caused by the zero insertion introduce frequency content not present in the input signal. The new frequency content lies above the Nyquist frequency of the input signal. A lowpass filter removes the frequency content above the Nyquist frequency of the input signal, removing the discontinuities and leaving only the original frequency content.

The preferred method of interpolation, as implemented in the prototype of the present invention, uses a FIR lowpass filter. Although other types of digital filters can be used, the FIR type is preferred due to its linear phase characteristics. For processing efficiency, the FIR filter is modified to eliminate the multiplications involving the zero values.

After the up-conversion, distortion function 68B is applied to the signal in the same manner as the distortion function described in the Preferred Embodiment—Operation section. In this case, however, the increased spectral headroom afforded by the higher sampling rate allows higher harmonics to be added to the signal without causing aliasing noise.

The sampling rate of the distorted signal is down-converted to a substantially lower rate by down-conversion 92. The down-conversion process is commonly known as decimation. Decimation is a technique well known in the art of DSP and details of its operation are not repeated here. In essence, a lowpass filter removes the frequency content above the Nyquist frequency of the down-converted signal. The signal can then be resampled at the lower sampling rate without causing aliasing noise. Resampling simply retains the samples that coincide with the lower sampling rate and discards the intermediate ones, assuming the down-conversion factor is an integer.

The preferred method of decimation, as implemented in the prototype of the present invention, uses a FIR lowpass filter. Although other types of digital filters can be used, the FIR type is preferred due to its linear phase characteristics. For processing efficiency, filter calculations are performed only for the samples that are retained. The down-converted signal is routed through output amplifier 72B, which operates the same as the output amplifier described in the Preferred Embodiment—Operation section.

All discussion of multirate processing so far has assumed the sampling rate of the down-converted signal is the same as that of the input signal. There may be some applications of the present invention where the input signal and output signal have different sampling rates, requiring different up-conversion and down-conversion factors. For example, the input may be a high-resolution professional audio signal having a 96 kHz sampling rate while the output has the standard professional audio sampling rate of 48 kHz.

Multiple-Stage Multirate Distortion Synthesizer—Description

Figure 7:
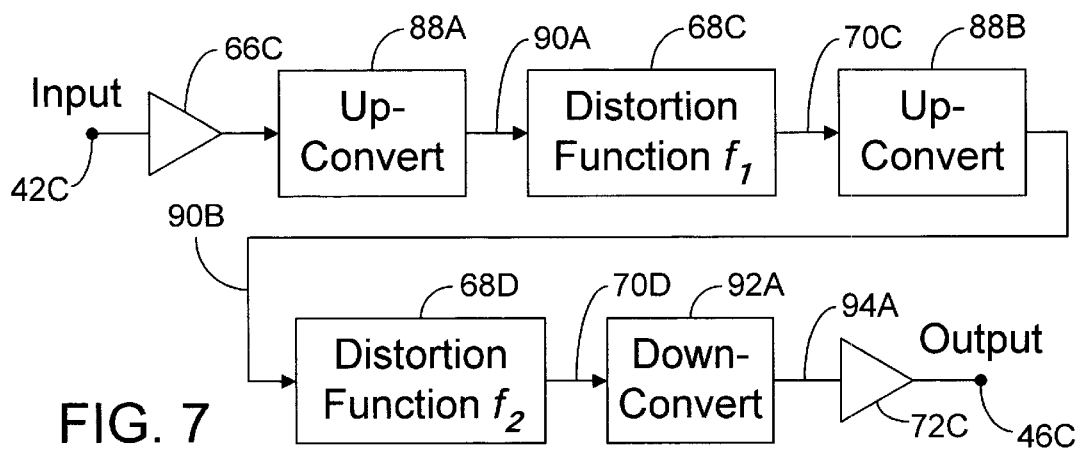
FIG. 7 is a block diagram of a variation of the distortion synthesizer shown in FIG. 6, in which multiple stages of up-conversion and distortion are used.

FIG. 7—Multiple-stage Multirate Distortion Synthesizer

FIG. 7 is a block diagram of a variation of the distortion synthesizer shown in FIG. 6, in which multiple stages of up-conversion and distortion are used. A digital input signal 42C is received by the input of an input amplifier 66C. The output of input amplifier 66C is up-converted by a first up-conversion 88A, producing a first up-converted signal 90A. A first distortion function 68C is applied to the first up-converted signal, producing a first distorted signal 70C. The first distorted signal is up-converted by a second up-conversion 88B, producing a second up-converted signal 90B. A second distortion function 68D is applied to the second up-converted signal, producing a second distorted signal 70D. The second distorted signal is down-converted by a down-conversion 92A, producing a down-converted signal 94A. The down-converted signal is routed to the input of an output amplifier 72C that produces a digital output signal 46C.

Multiple-Stage Multirate Distortion Synthesizer—Operation

Operation of the Multiple-Stage Multirate Distortion Synthesizer will be Described Further with Reference to FIG. 7.

This embodiment expands on the multirate distortion synthesizer previously described, adding a second stage comprising second up-conversion 88B and second distortion function 68D. Each element in this embodiment operates the same as its counterpart described in the Multirate Distortion Synthesizer—Operation section. Dividing the up-conversion process into multiple stages improves computational efficiency. The efficiency comes from the filters' lengths being shorter than that of a single-stage up-conversion with an equivalent up-conversion factor. The computational requirement for each stage is reduced to such a degree that there is an overall reduction compared to the single-stage up-conversion.

The first up-conversion provides spectral headroom for the first distortion function to add harmonics without causing aliasing noise, just the same as a single-stage multirate distortion synthesizer. The second up-conversion provides further headroom for the second distortion function to add more harmonics. The second distortion function produces frequencies that are harmonics of the original input signal and of the harmonics added by the first distortion function. This compounds the harmonic-producing effect of both distortion functions.

For the usual two-stage interpolation, the stopband frequency of the second interpolation filter is set to the Nyquist frequency of the signal entering the second stage. Adding a distortion function to the first stage adds harmonic content to the signal that is in the ultrasonic range, reducing the headroom of the second stage. Lowering the stopband frequency to the same as that of the first stage's interpolation filter removes the ultrasonic harmonics, further increasing the headroom of the second stage. The lower stopband frequency requires a longer filter but the additional computations needed are traded for a significant increase in harmonics, especially when considering the combined effect of both stages.

Multiple-Stage Distortion Synthesizer—Description

Figure 8:
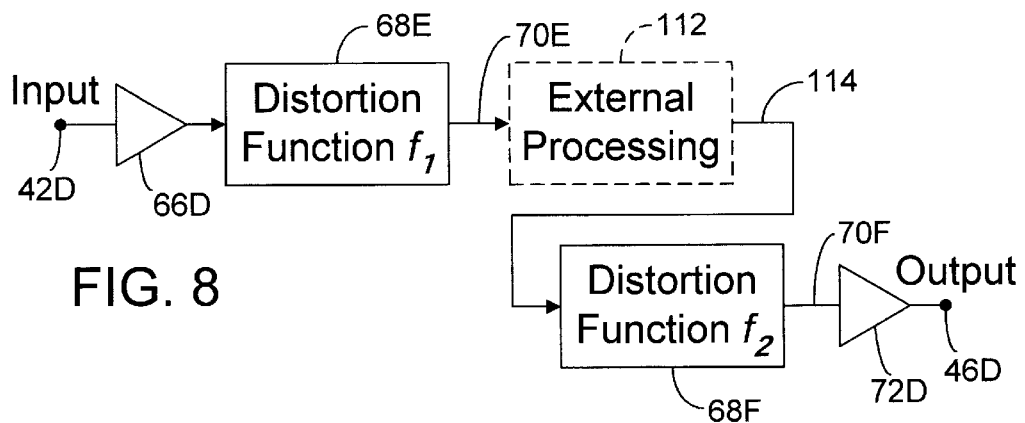
FIG. 8 is a block diagram of another embodiment of the distortion synthesizer shown in FIG. 1, in which multiple stages of distortion are used with additional external processing.

FIG. 8—Multiple-Stage Distortion Synthesizer

FIG. 8 is a block diagram of another embodiment of the distortion synthesizer shown in FIG. 1, in which multiple stages of distortion are used with additional external processing. A digital input signal 42D is received by the input of an input amplifier 66D. A first distortion function 68E is applied to the output of input amplifier 66D, producing a first distorted signal 70E. An external process 112 is performed on the first distorted signal, producing an externally processed signal 114. A second distortion function 68F is applied to the externally processed signal, producing a second distorted signal 70F. The second distorted signal is routed to the input of an output amplifier 72D that produces a digital output signal 46D.

Multiple-Stage Distortion Synthesizer—Operation

Operation of the Multiple-Stage Distortion Synthesizer will be described Further with Reference to FIG. 8.

Digital input signal 42D is routed through input amplifier 66D, which operates the same as the input amplifier described in the Preferred Embodiment—Operation section. Two distortion functions, 68E and 68F, are applied to the signal, each of which operates the same as the distortion function described in the Preferred Embodiment—Operation section. Each distortion function can use a different distortion model. After the first distortion function is applied, the signal undergoes external process 112 that modifies the signal. The external process may be performed by the apparatus of the present invention, but is neither specified by nor specifically part of the present invention. After the external process, the second distortion function is applied to the signal. The signal is routed through output amplifier 72D, which operates the same as the output amplifier described in the Preferred Embodiment—Operation section.

This embodiment of the distortion synthesizer provides the foundation for synthesizing the effects of distortion devices having more than one non-linear element in series. Multiple non-linear elements can be represented by a single distortion model if they are directly coupled, having no intermediate phase shifts. If phase shifting occurs in the signal path between the non-linear elements, a single distortion model cannot be derived that accurately synthesizes the combined non-linear elements. In such a case, separate distortion models and distortion stages must be used along with additional intermediate processing that emulates the circuitry causing the phase shift. The multiple-stage distortion synthesizer provides the distortion effects while the external process provides the effects of capacitive coupling, filtering, etc.

Although two distortion stages with intermediate external processing has been discussed, it should be understood that the number of stages is not limited to two.

Figure 9:
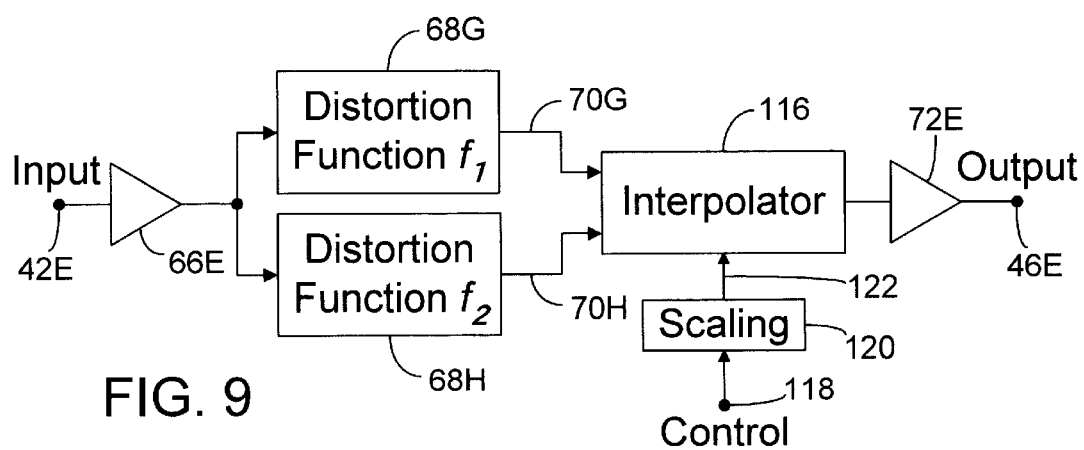
FIG. 9 is a block diagram of another embodiment of the distortion synthesizer shown in FIG. 1, in which parallel distortion is used.

Parallel Distortion Synthesizer—Description
FIG. 9—Parallel Distortion Synthesizer FIG. 9 is a block diagram of another embodiment of the distortion synthesizer shown in FIG. 1, in which parallel distortion is used. A digital input signal 42E is received by the input of an input amplifier 66E. A first distortion function 68G is applied to the output of input amplifier 66E, producing a first distorted signal 70G. In parallel, a second distortion function 68H is applied to the output of input amplifier 66E, producing a second distorted signal 70H. The first distorted signal is routed to the first signal input of an interpolator 116. The second distorted signal is routed to the second signal input of interpolator 116. A control signal 118 undergoes a scaling operation 120, producing a scaled control signal 122. The scaled control signal is routed to the control input of interpolator 116. The output of interpolator 116 is routed to the input of an output amplifier 72E that produces a digital output signal 46E.

Parallel Distortion Synthesizer—Operation
Operation of the Parallel Distortion Synthesizer will be Described Further with Reference to FIG. 9.

Digital input signal 42E is routed through input amplifier 66E, which operates the same as the input amplifier described in the Preferred Embodiment—Operation section. Two distortion functions, 68G and 68H, are applied to the signal in parallel to produce two distorted signals. Each distortion function operates the same as the distortion function described in the Preferred Embodiment—Operation section. Each distortion function uses a different distortion model.

Interpolator 116 produces a single, composite signal by interpolating between the two distorted signals. Linear interpolation is used to determine the value between the two distorted-signal values at a position dictated by the control signal at the control input of the interpolator. In this manner, the two distorted signals are combined or mixed in a predetermined ratio that is governed by the control signal. The output of the interpolator is routed through output amplifier 72E, which operates the same as the output amplifier described in the Preferred Embodiment—Operation section.

Control signal 118 has a normalized range of zero to one. The control signal is scaled before it is used to control the interpolator. Scaling operation 120 consists of multiplying the control signal by a scale factor, adding an offset value, and limiting the output to the range of zero to one. The scale factor and offset value are programmable by the user. This scaling arrangement allows a large degree of flexibility in how the interpolator responds to the control signal.

Control signal 118 can originate from a variety of sources. The apparatus of the present invention can be equipped with an A/D converter for digitizing the output voltage from a foot pedal or similar device to produce a suitable control signal. This would allow the user to control the mix of the two distortion effects by the position of the foot pedal. The apparatus of the present invention can be equipped with a musical instrument digital interface (MIDI), allowing it to receive MIDI control change messages. The control values from the messages can be used as the control signal after being normalized. This would allow any device capable of transmitting MIDI control change messages to be used to control the mix of the two distortion effects.

A well-known audio signal processor, the compressor, is often used together with a distortion device. The compressor usually precedes the distortion device in the signal chain. A primary element of the compressor is the level detector, which produces a signal representing the amplitude envelope of the input signal. The envelope signal undergoes processing to modify its dynamic characteristics, allowing its attack and release time to be controlled. The processed envelope signal controls the compressor's gain element. If the compressor is implemented in the apparatus of the present invention, the processed envelope signal can also be used as the control signal for the parallel distortion synthesizer. Alternatively, only the level detector function can be implemented to generate the control signal if the compressor function is not needed.

Using the envelope of the input signal to control the mix of two distortion effects provides important capabilities to the distortion synthesizer. For guitar players, varying the amount of distortion through playing-intensity variations or by changing the guitar's volume control is a common technique. The present arrangement of the parallel distortion synthesizer gives a greater degree of control over this technique than can be achieved with a single distortion effect. Also, the distortion characteristics of some distortion devices vary dynamically with the amplitude of the input signal. For example, a vacuum tube can be driven hard enough to cause grid current to flow which shifts the grid's bias and changes the tube's distortion characteristics. The present arrangement of the parallel distortion synthesizer can mimic such behavior with the appropriate combination of distortion models.

Figure 10:
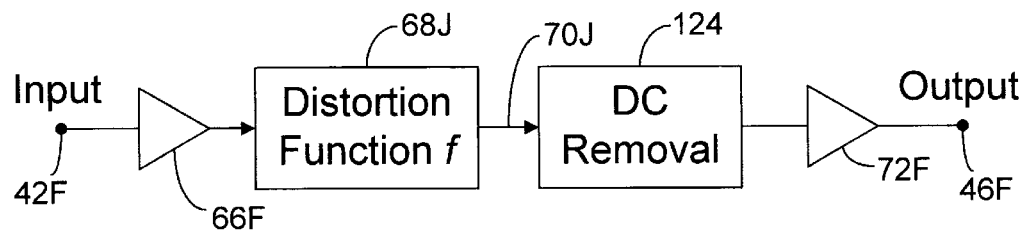
FIG. 10 is a block diagram of another embodiment of the distortion synthesizer shown in FIG. 1, in which DC removal is used.

Distortion Synthesizer with DC Removal—Description
FIG. 10—Distortion Synthesizer with DC Removal FIG. 10 is a block diagram of another embodiment of the distortion synthesizer shown in FIG. 1, in which DC removal is used. A digital input signal 42F is received by the input of an input amplifier 66F. A distortion function 68J is applied to the output of input amplifier 66F, producing a distorted signal 70J. Distorted signal 70J undergoes a DC-removal operation 124. The resulting signal is routed to the input of an output amplifier 72F that produces a digital output signal 46F.

Distortion Synthesizer with DC Removal—Operation

Operation of the Distortion Synthesizer with DC Removal will be described Further with Reference to FIG. 10.

Digital input signal 42F is routed through input amplifier 66F, which operates the same as the input amplifier described in the Preferred Embodiment—Operation section. Distortion function 68J is applied to the signal, operating the same as the distortion function described in the Preferred Embodiment—Operation section.

Some distortion models, especially those containing even harmonics, may cause the distortion synthesizer to induce a direct-current (DC) component into the distorted signal. To prevent possible ill effects, it is generally desirable to remove the DC component from the signal. Highpass filters or differentiators can be used to remove DC from digital signals, but they may alter the signal's bandwidth or phase. The present invention's DC removal method cancels the DC without affecting the signal's phase or usable bandwidth.

Figure 18:
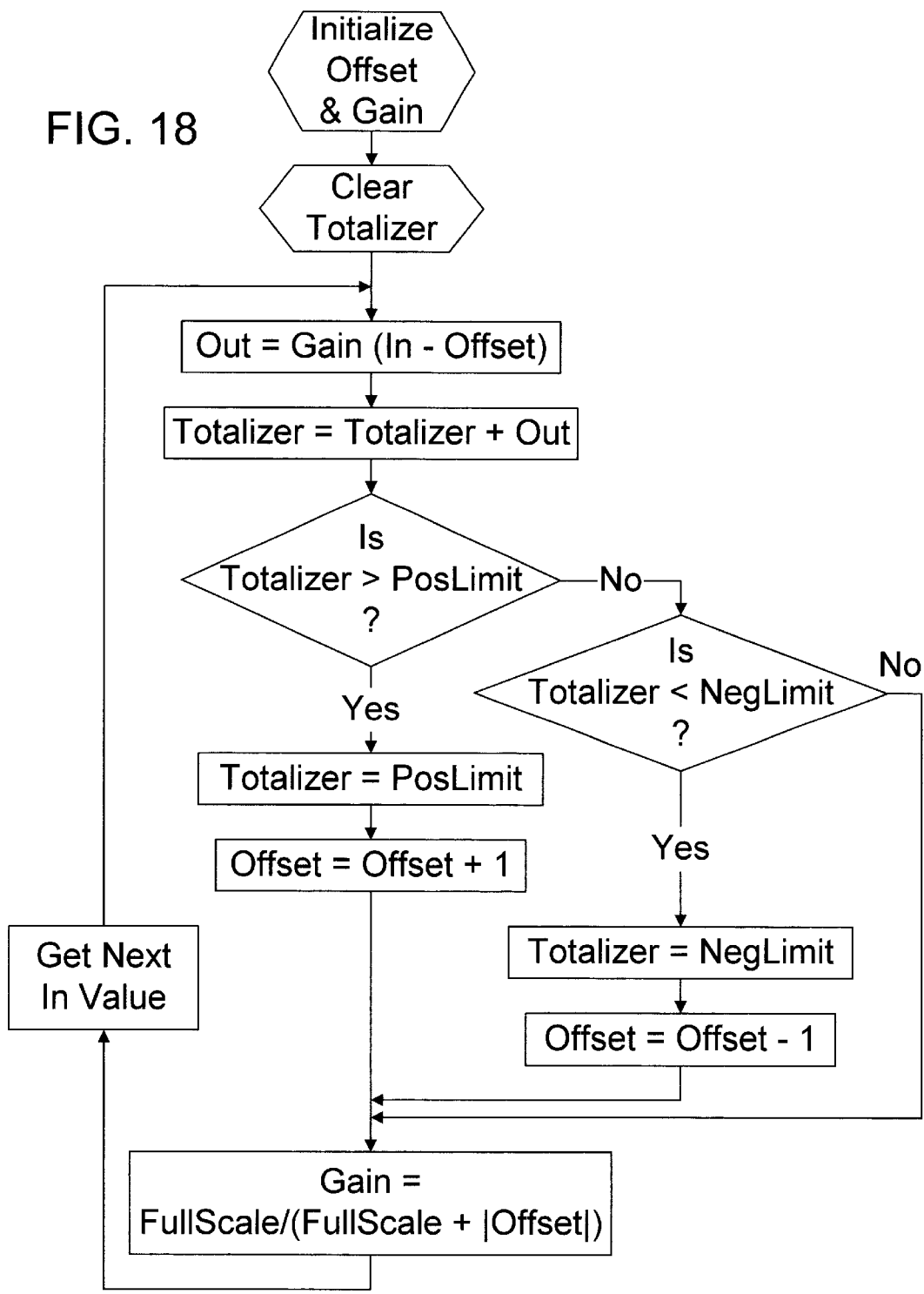
FIG. 18 is a flowchart of the DC Removal section shown in FIG. 10.

FIG. 18 shows a flowchart of a program that performs the DC-removal operation 124 of FIG. 10 as implemented in the prototype of the present invention. It operates on the premise that a running total or summation of a signal's values is confined to a predictable proximity to zero when the signal contains no DC. The program variable Totalizer contains the running total. If Totalizer exceeds either of the limits set by program variables PosLimit and NegLimit, the program variable Offset is adjusted accordingly. The Offset value is subtracted from the signal value, thus canceling the signal's DC. The program variable Gain reduces the signal's amplitude in proportion to the Offset value to prevent clipping. The program variables In and Out represent the respective input and output signals of the DC-removal operation.

The PosLimit and NegLimit values must be selected to accommodate the lowest frequency of the signal. Given an absolute value of Limit, PosLimit is equal to Limit and NegLimit is the negative equivalent of Limit. The formula for calculating Limit is:

$$Limit = \frac{.707}{4F_{MIN}} \cdot F_S \cdot FullScale \qquad \text{Expression (7)}$$

where:

$F_{MIN}$ is the lowest frequency of the signal $F_S$ is the sampling rate

FullScale is the maximum absolute value of the signal

After the distorted signal undergoes the DC-removal operation, it is routed through output amplifier 72F, which operates the same as the output amplifier described in the Preferred Embodiment—Operation section.

Distortion Synthesizer with Dynamics Control— Description

Figure 11:
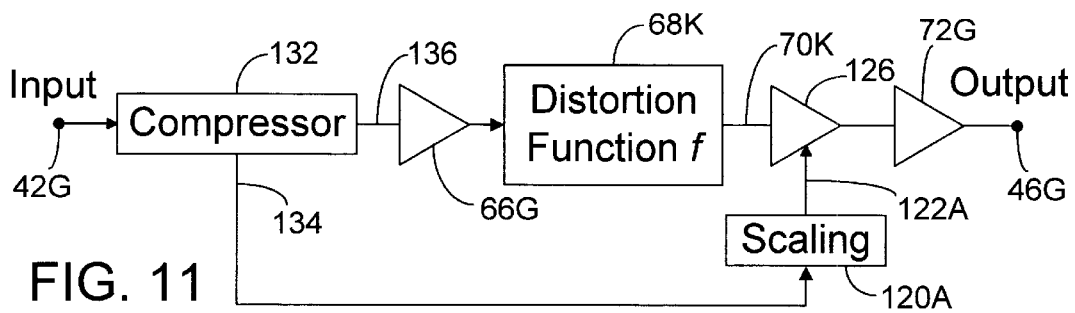
FIG. 11 is a block diagram of another embodiment of the distortion synthesizer shown in FIG. 1, in which dynamics control is used.

FIG. 11—Distortion Synthesizer with Dynamics Control

FIG. 11 is a block diagram of another embodiment of the distortion synthesizer shown in FIG. 1, in which dynamics control is used. A digital input signal 42G is received by the input of a compressor 132. The audio output of compressor 132 produces a compressed signal 136 that is routed to the input of an input amplifier 66G. The gain control output of compressor 132 produces a gain-control signal 134. A distortion function 68K is applied to the output of input amplifier 66G, producing a distorted signal 70K. Distorted signal 70K is routed to the signal input of a digitally controlled amplifier 126. Gain-control signal 134 undergoes a scaling operation 120A, producing a scaled control signal 122A. The scaled control signal is routed to the control input of digitally controlled amplifier 126. The output of digitally controlled amplifier 126 is routed to the input of an output amplifier 72G that produces a digital output signal 46G.

Distortion Synthesizer with Dynamics Control— Operation

Operation of the Distortion Synthesizer with Dynamics Control will be Described Further with Reference to FIG. 11.

Digital input signal 42G is compressed by compressor 132. Distortion function 68K is applied to the compressed signal after being routed through input amplifier 66G. The input amplifier and distortion function operate the same as their counterparts described in the Preferred Embodiment— Operation section. The distortion effect imparted by the distortion function varies with the amplitude of the signal being distorted. The compressor, sometimes referred to as a compressor/limiter, reduces or restricts the dynamic range and the dynamics of the input signal. By compressing the signal before it enters the distortion stage, a more constant distortion effect is achieved. To achieve a constant distortion effect while retaining the original dynamics of the signal, digitally controlled amplifier 126 restores the dynamics removed by the compressor. A signal from within the compressor that represents the magnitude of compression controls the digitally controlled amplifier's gain.

The compressor is well known in the art of audio signal processing and details of its operation are not repeated here. A compressor generates a gain-control signal to control the compressor's gain element. The gain-control signal is derived from the amplitude envelope of the input signal and is processed to control its dynamic characteristics. The gain-control signal is additionally processed to control the range and degree of the compressor's gain reduction.

The gain-control signal generated by the compressor incorporated into the distortion synthesizer of the present invention also controls the digitally controlled amplifier. The gain-control signal undergoes a scaling operation before being routed to the control input of the digitally controlled amplifier. The scaling operation involves multiplying the gain-control signal by a scale factor, adding an offset value, and limiting the output to the range of zero to one. The scale factor and offset value are programmable by the user. The scale factor can be positive or negative to allow for a wide range of dynamics-altering effects.

The digitally controlled amplifier multiplies the distorted signal at its signal input by the scaled gain-control signal at its control input, thereby controlling the amplitude of the distorted signal. The output of the digitally controlled amplifier is routed through output amplifier 72G, which operates the same as the output amplifier described in the Preferred Embodiment—Operation section.

Distortion Synthesizer with Combined Elements— Description

Figure 15:
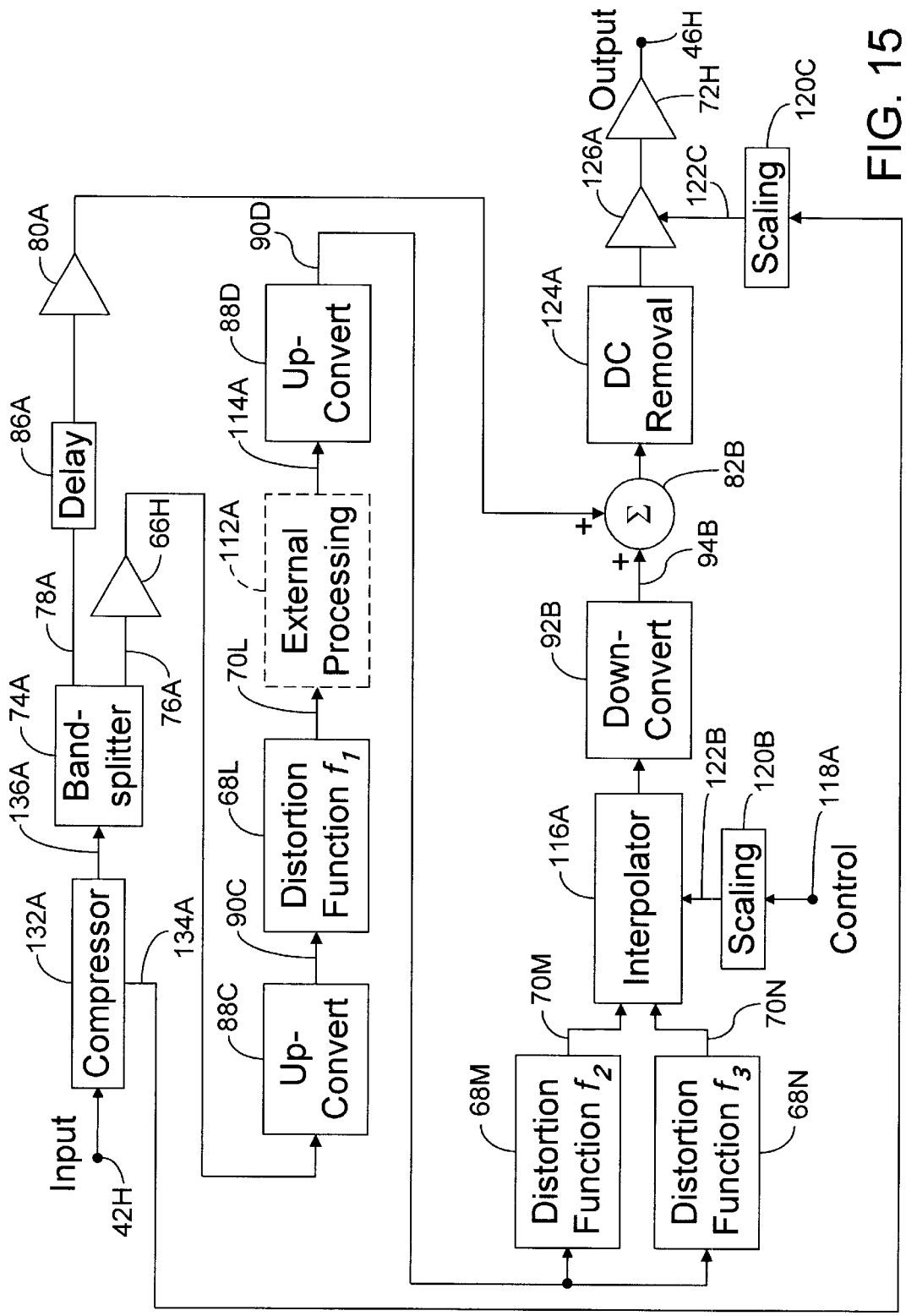
FIG. 15 is a block diagram of another embodiment of the distortion synthesizer shown in FIG. 1, combining elements from other embodiments.

FIG. 15—Distortion Synthesizer with Combined Elements

FIG. 15 is a block diagram of another embodiment of the distortion synthesizer shown in FIG. 1, combining elements from other embodiments. A digital input signal 42H is received by the input of a compressor 132A. The audio output of compressor 132A produces a compressed signal 136A that is routed to the input of a bandsplitter 74A. The gain control output of compressor 132A produces a gain-control signal 134A. A lowpass output 76A of the bandsplitter is routed to the input of an input amplifier 66H. A highpass output 78A of the bandsplitter is routed to the input of a delay element 86A. The output of delay element 86A is routed to the input of a highpass amplifier 80A.

The output of input amplifier 66H is up-converted by a first up-conversion 88C, producing a first up-converted signal 90C. A first distortion function 68L is applied to the first up-converted signal, producing a first distorted signal 70L. An external process 112A is performed on the first distorted signal, producing an externally processed signal 114A. The externally processed signal is up-converted by a second up-conversion 88D, producing a A second up-converted signal 90D. A second distortion function 68M is applied to second up-converted signal 90D, producing a second distorted signal 70M. In parallel, a third distortion function 68N is applied to second up-converted signal 90D, producing a third distorted signal 70N. The second distorted signal is routed to the first signal input of an interpolator 116A. The third distorted signal is routed to the second signal input of interpolator 116A.

A control signal 118A undergoes a scaling operation 120B, producing a scaled control signal 122B. The scaled control signal is routed to the control input of interpolator 116A. The output of interpolator 116A is down-converted by a down-conversion 92B, producing a down-converted signal 94B. The output of highpass amplifier 80A is routed to the first positive input of an adder 82B. Down-converted signal 94B is routed to the second positive input of adder 82B. The output of adder 82B undergoes a DC-removal operation 124A. The resulting signal is routed to the signal input of a digitally controlled amplifier 126A. Gain-control signal 134A undergoes a scaling operation 120C, producing a scaled control signal 122C. The scaled control signal is routed to the control input of digitally controlled amplifier 126A. The output of digitally controlled amplifier 126A is routed to the input of an output amplifier 72H that produces a digital output signal 46H.

Distortion Synthesizer with Combined Elements— Operation

Operation of the Distortion Synthesizer with Combined Elements will be Described Further with Reference to FIG. 15.

This embodiment combines the elements of the embodiments previously described in the Other Embodiments section. Although many different combinations are possible, this combination demonstrates how the different elements can be combined for maximum effectiveness and processing efficiency.

Digital input signal 42H is first processed by compressor 132A. The dynamics of the input signal are reduced by the compressor before the distortion functions are applied. The dynamics of the distorted signal are restored by digitally controlled amplifier 126A before the signal is routed through output amplifier 72H. The operation of the compressor, digitally controlled amplifier, and related scaling operation 120C is the same as that of their counterparts described in the Distortion Synthesizer with Dynamics Control—Operation section. The output amplifier, which is common to all embodiments of the distortion synthesizer, operates the same as the output amplifier described in the Preferred Embodiment—Operation section.

This embodiment combines bandsplitter 74A with multirate processing for enhanced aliasing-noise suppression. Combining the bandsplitter with multirate processing requires the addition of a signal delay in the highpass signal's path The time delay of delay element 86A equals the time delay induced by the sampling-rate up-conversions and down-conversion, thus keeping the lowpass and highpass signals time-aligned. The positions of the bandsplitter and adder 82B allow them to operate at the low sampling rate. The bandsplitter, highpass amplifier 80A, and adder operate the same as their counterparts described in the Distortion Synthesizer with Bandsplitter—Operation section. The delay element is simply a first-in, first-out memory buffer.

The lowpass signal from the bandsplitter has distortion effects added to it before being combined with the delayed highpass signal. Parallel distortion synthesis is integrated with multiple-stage multirate distortion synthesis to provide enhanced distortion effects. The first up-conversion, first distortion function, and down-conversion are elements common to both the multirate distortion synthesizer and multiple-stage multirate distortion synthesizer. First up-conversion 88C, first distortion function 68L, and down-conversion 92B operate the same as their counterparts described in the Multirate Distortion Synthesizer—Operation section. The input amplifier is common to all embodiments of the distortion synthesizer. Input amplifier 66H operates the same as the input amplifier described in the Preferred Embodiment—Operation section. External process 112A is included after the first distortion function to accommodate any inter-stage processing requirements. The external process is described in the Multiple-stage Distortion Synthesizer—Operation section.

The multirate distortion synthesizer is expanded to a multiple-stage multirate distortion synthesizer by second up-conversion 88D and a second stage of distortion that, in this embodiment, comprises parallel distortion functions 68M and 68N. The second stage of up—conversion and distortion operates in the same manner as described in the Multiple-stage Multirate Distortion Synthesizer—Operation section. Each of the parallel distortion functions operates as if it were the only second stage distortion function. The parallel distorted signals are combined into one signal by interpolator 116A. The interpolator and the related control signal 118A and scaling operation 120B operate the same as their counterparts described in the Parallel Distortion Synthesizer—Operation section.

DC-removal operation 124A is positioned after the adder that combines the highpass signal with the distorted signal. The DC-removal operation is described in the Distortion Synthesizer with DC Removal—Operation section.

Conclusions, Rammifications, and Scope

Thus it can be seen that the present invention provides an effective method for accurately synthesizing the distortion effects of other distortion devices while providing the ability to create new effects. In addition, it provides powerful methods for suppressing the aliasing noise that usually accompanies digital distortion.

Although the description above contains many specificities, these should not be construed as limiting the scope of the invention but as merely providing illustrations of some of the presently preferred embodiments of this invention. Various other embodiments and ramifications are possible within its scope. For example, a method for applying the distortion function with a look-up table is described in the Preferred Embodiment—Operation section. An alternative method is possible in which the look-up table is filled with values that represent the difference between the input signal and the distorted signal. The table values are obtained by applying the distortion function and necessary scaling to the input values and subtracting the input values from the distorted values. As such, the look-up table contains only the distortion that is added to the input signal by the distortion function. The non-linear transformation of the input signal is performed by adding the input-signal value to the corresponding value from the look-up table. The amount of distortion added to the input signal may be controlled by first multiplying the look-up table value by a scale factor. By varying the scale factor between the limits of zero and one, the distortion effect is varied from no distortion to the full distortion of the distortion function. In this manner, a range of distortion effects is obtained from a single distortion model while requiring only a minimal amount of additional calculations.

The aforementioned method may also be substituted for the parallel distortion functions and interpolator of the parallel distortion synthesizer, using scaled control signal 122 as the scale factor. In this manner, a single distortion function can provide a dynamically variable distortion effect while requiring fewer calculations as compared to the parallel distortion synthesizer.

Accordingly, the scope of the invention should be determined by the appended claims and their legal equivalents, rather than by the examples given.

What is claimed is:

1. A method of synthesizing harmonic distortion comprising:
   providing a distortion model comprising parametric data representing the harmonic amplitude and phase characteristics of a distorted sinusoidal signal resulting from the application of an undistorted sinusoidal signal to a target distortion device;
   and imparting a harmonic distortion effect to a digital signal of interest by modifying the digital signal in accordance with the harmonic amplitude and phase characteristics of the distortion model.

2. The method of claim 1 wherein the distortion model is obtained by:
   producing a series of digital values representing the distorted sinusoidal signal;
   and Fourier transforming the series of digital values into a series of harmonic amplitude and phase parameters.

3. The method of claim 2 wherein the obtaining of the distortion model also includes correcting the phase parameters to compensate for the phase shift of harmonics in the distorted sinusoidal signal.

4. The method of claim 1 wherein the imparting of a harmonic distortion effect to the digital signal comprises applying a distortion function to the digital signal with the distortion function being selected from the group consisting of a weighted sum of sines of harmonic arcsines, a weighted sum of cosines of harmonic arccosines, and a weighted sum of Chebyshev polynomials, the parameters for the selected distortion function being obtained from the distortion model.

5. The method of claim 4, further including:
   separating the digital signal into a lowpass signal a highpass signal, with the distortion function being applied to the lowpass signal to produce a distorted signal;
   and combining the highpass signal and the distorted signal to produce a signal having the desired distortion effect.

6. The method of claim 4, further including:
   up-converting the digital signal to produce an up-converted signal having a sampling rate substantially higher than that of the digital signal, with the distortion function being applied to the up-converted signal to produce a distorted signal;
   and down-converting the distorted signal to produce a down-converted signal having a sampling rate substantially lower than that of the distorted signal.

7. The method of claim 4, further including:
   up-converting the digital signal to produce a first upconverted signal having a sampling rate substantially higher than that of the digital signal, with the distortion function being applied to the first up-converted signal to produce a first distorted signal;
   up-converting the first distorted signal to produce a second up-converted signal having a sampling rate substantially higher than that of the first distorted signal;
   applying a second distortion function to the second up-converted signal to produce a second distorted signal;
   and down-converting the second distorted signal to produce a down-converted signal having a sampling rate substantially lower than that of the second distorted signal.

8. The method of claim 4, further including:
   applying a second distortion function to the digital signal so as to provide two distorted signals in parallel; and combining the distorted signals in a predetermined ratio.

9. The method of claim 4, further including:
   removing any direct-current component from the digital signal after the distortion function is applied to the digital signal.

10. The method of claim 4, further including:
    reducing the dynamic range of the amplitude of the digital signal to produce a compressed signal, with the distortion function being applied to the compressed signal to produce a distorted signal;
    providing a gain control signal representing the magnitude of compression of the compressed signal;
    scaling the gain-control signal to produce a scaled control signal;
    and changing the amplitude of the distorted signal in accordance with the scaled control signal.

11. The method of claim 4, further including:
    separating the digital signal into a lowpass signal and a highpass signal;
    up-converting the lowpass signal to produce an up-converted signal having a sampling rate substantially higher than that of the, lowpass signal, with the distortion function being applied to the up-converted signal to produce a distorted signal;
    down-converting the distorted signal to produce a down-converted signal having a sampling rate substantially lower than that of the distorted signal;
    delaying the highpass signal to produce a delayed highpass signal;
    and combining the delayed highpass signal and the down-converted signal to produce a signal having the desired distortion effect.

12. A method of modeling harmonic distortion comprising:
    applying a sinusoidal signal to a target distortion device to produce a distorted sinusoidal signal;
    sampling the distorted sinusoidal signal and producing a series of digital values representing the distorted sinusoidal signal;
    and performing a Fourier transform on the series of digital values to produce a distortion model comprising parametric data representing the harmonic amplitude and phase characteristics of the distorted sinusoidal signal, with the distortion model being suitable for use with a distortion synthesizer to reproduce the harmonic distortion characteristics of the target distortion device.

13. Apparatus for synthesizing harmonic distortion comprising:
    means for providing a distortion model comprising parametric data repressing the harmonic amplitude and phase characteristics of a distorted sinusoidal signal resulting the application of an undistorted sinusoidal signal to a target distortion device;
    and distortion synthesizer means responsive to the distortion model for imparting a harmonic distortion effect to a digital signal of interest by modifying the digital signal in accordance with the harmonic amplitude and phase characteristics of the distortion model, whereby distortion characteristic of the target distortion device are imparted to the digital signal.

14. The apparatus of claim 13 wherein the means for providing a distortion model comprises:
    means for producing a series of digital values representing a distorted sinusoidal signal resulting from the application of an undistorted sinusoidal signal to a target distortion device;

and a Fourier transform mechanism for transforming the series of digital values into a series of harmonic amplitude and phase parameters which are used to develop the distortion model.

15. The apparatus of claim 13, further including:

a harmonic editor mechanism for modifying the harmonic amplitude and phase parameters of the distortion model;

and a data-storage mechanism for storage and retrieval of a plurality of different distortion models.

16. The apparatus of claim 13 wherein the distortion synthesizer means comprises a non-linear transformation mechanism for applying a distortion function to the digital signal with the distortion function being selected from the group consisting of a weighted sum of sines of harmonic arcsines, a weighted sum of cosines of harmonic arceosines, and a weighted sum of Chebyshev polynomials, the parameters for the selected distortion function being obtained from the distortion model.

17. The apparatus of claim 16, further including:

a frequency bandsplitter mechanism for separating the digital signal into a lowpass signal and a highpass signal, with the distortion function of the non-linear transformation mechanism being applied to the lowpass signal to produce a distorted signal;

and a signal-combining mechanism for combining the highpass signal and the distorted signal to produce a signal having the desired distortion effect.

18. The apparatus of claim 16, further including:

a sampling-rate increasing mechanism for up-converting the digital signal to produce an up-converted signal having a sampling rate substantially higher than that of the digital signal, with the distortion function of the non-linear transformation mechanism being applied to the up-converted signal to produce a distorted signal;

and a sampling-rate decreasing mechanism for down-converting the distorted signal to produce a down-converted signal having a sampling rate substantially lower than that of the distorted signal.

19. The apparatus of claim 16, further including:

a first sampling-rate increasing mechanism for up-converting the digital signal to produce a first up-converted signal having a sampling rate substantially higher than that of the digital signal, with the distortion function of the non-linear transformation mechanism being applied to the first up-converted signal to produce a first distorted signal;

a second sampling-rate increasing mechanism for up-converting the first distorted signal to produce a second up-converted signal having a sampling rate substantially higher than that of the first distorted signal;

a second non-linear transformation mechanism for applying a second distortion function to the second up-converted signal to produce a second distorted signal.

and a sampling-rate decreasing mechanism for down-converting the second distorted signal to produce a down-converted signal having sampling rate substantially lower than that of the second distorted signal.

20. The apparatus of claim 16, further including:

a frequency bandsplitter mechanism for separating the digital into a lowpass signal and a highpass signal;

and a sampling-rate decreasing mechanism for up-converting the lowpass signal to produce an up-converted signal having a sampling rate substantially higher than that of the lowpass signal, with the distortion function of the non-linear transformation mechanism being applied to the up-converted signal to produce a distorted signal;

a sampling-rate decreasing mechanism for up-converting the distorted signal to produce an up-converted signal having a sampling rate substantially lower than that of the distorted signal;

a signal delay mechanism for delaying the highpass signal to produce a delayed highpass signal;

and a signal-combining mechanism for combining the delayed highpass signal and the down-converted signal to produce a signal having the desired distortion effect.

* * * * *